US010657029B2

(12) United States Patent
Aldrich et al.

(10) Patent No.: US 10,657,029 B2
(45) Date of Patent: May 19, 2020

(54) PARTITIONING BLOCK DIAGRAMS INTO EXECUTABLE CONTEXTUAL MODELS

(71) Applicant: The MathWorks, Inc., Natick, MA (US)

(72) Inventors: William J. Aldrich, Sudbury, MA (US); Ebrahim Mehran Mestchian, Newton, MA (US); Denizhan N. Alparslan, Natick, MA (US)

(73) Assignee: The MathWorks, Inc., Natick, MA (US)

(*) Notice: Subject to any disclaimer, the term of this patent is extended or adjusted under 35 U.S.C. 154(b) by 869 days.

(21) Appl. No.: 14/461,906

(22) Filed: Aug. 18, 2014

(65) Prior Publication Data

US 2014/0358507 A1   Dec. 4, 2014

Related U.S. Application Data

(62) Division of application No. 13/117,936, filed on May 27, 2011, now Pat. No. 8,812,276.

(60) Provisional application No. 61/348,969, filed on May 27, 2010.

(51) Int. Cl.
*G06F 8/10* (2018.01)
*G06F 8/34* (2018.01)
*G06F 11/36* (2006.01)

(52) U.S. Cl.
CPC ............ *G06F 11/3664* (2013.01); *G06F 8/10* (2013.01); *G06F 11/3608* (2013.01); *G06F 8/34* (2013.01)

(58) Field of Classification Search
CPC .... G06F 11/3664; G06F 8/10; G06F 11/3608; G06F 8/34
See application file for complete search history.

(56) References Cited

U.S. PATENT DOCUMENTS

| | | |
|---|---|---|
| 5,850,560 A | 12/1998 | Kang |
| 7,178,112 B1 | 2/2007 | Ciolfi et al. |
| 7,324,931 B1 | 1/2008 | Warlock |

(Continued)

FOREIGN PATENT DOCUMENTS

WO   WO-2007/022289 A2   2/2007

OTHER PUBLICATIONS

Antoulas, et al., "A survey of model reduction methods for large-scale systems," Contemporary Mathematics, Oct. 27, 2006, pp. 1-28.

(Continued)

*Primary Examiner* — Jay Hann
(74) *Attorney, Agent, or Firm* — Cesari and McKenna, LLP; Michael R. Reinemann

(57) ABSTRACT

A system and method generates a contextual model for a source model. The system and method receives a designation of a component of interest in the source model. The system and method analyzes the source model and identifies those model elements within the source model that have an interaction behavior with the component of interest. The system and method includes the component of interest and the model elements having the interaction behavior with the component of interest in the contextual model. The system and method connects the model elements to the component of interest in the context model in a similar manner as in the source model. The context model may be run or evaluated.

23 Claims, 18 Drawing Sheets

(56) References Cited

U.S. PATENT DOCUMENTS

| | | | |
|---|---|---|---|
| 7,412,366 B1 | 8/2008 | Englehart et al. | |
| 7,424,410 B2 | 9/2008 | Orofino, II et al. | |
| 7,434,183 B2 | 10/2008 | McGaughy et al. | |
| 7,464,373 B1* | 12/2008 | Yunt | G06F 11/3664 717/125 |
| 7,558,712 B1 | 7/2009 | Aldrich | |
| 7,590,614 B2* | 9/2009 | Fildebrandt | G06F 8/34 |
| 7,644,398 B2* | 1/2010 | Cleaveland | G06F 11/3684 703/16 |
| 7,680,632 B1 | 3/2010 | Aldrich | |
| 7,680,637 B1 | 3/2010 | Wolodkin | |
| 7,698,668 B2 | 4/2010 | Balasubramanian et al. | |
| 7,701,869 B2* | 4/2010 | Hogan | G06F 11/3664 370/229 |
| 7,774,172 B1 | 8/2010 | Yunt et al. | |
| 7,809,545 B2 | 10/2010 | Ciolfi et al. | |
| 7,818,730 B1 | 10/2010 | Ryan et al. | |
| 7,912,692 B2 | 3/2011 | Matsushita et al. | |
| 7,934,194 B2 | 4/2011 | Kinnucan, Jr. et al. | |
| 7,941,299 B1 | 5/2011 | Aldrich et al. | |
| 8,041,554 B1 | 10/2011 | Limondin et al. | |
| 8,104,017 B2 | 1/2012 | Lin et al. | |
| 8,108,728 B2 | 1/2012 | Das et al. | |
| 8,131,528 B1 | 3/2012 | Vora et al. | |
| 8,176,479 B2* | 5/2012 | Morrow | G06F 8/38 715/967 |
| 8,522,196 B1 | 8/2013 | Kim et al. | |
| 8,620,629 B1 | 12/2013 | Li et al. | |
| 8,732,669 B2 | 5/2014 | Valdiviezo Basauri et al. | |
| 8,756,562 B2* | 6/2014 | Ciolfi | G06F 8/34 717/105 |
| 9,021,409 B2 | 4/2015 | Vasudevan et al. | |
| 9,152,390 B1 | 10/2015 | Tripakis et al. | |
| 9,183,120 B1 | 11/2015 | Webb | |
| 2003/0167182 A1 | 9/2003 | Bloom et al. | |
| 2007/0157162 A1* | 7/2007 | Ciolfi | G06F 8/35 717/105 |
| 2007/0266366 A1 | 11/2007 | Bucuvalas | |
| 2008/0092109 A1 | 4/2008 | Kinnucan, Jr. et al. | |
| 2008/0092111 A1 | 4/2008 | Kinnucan et al. | |
| 2008/0098349 A1 | 4/2008 | Lin et al. | |
| 2008/0172212 A1 | 7/2008 | Gahinet et al. | |
| 2008/0263506 A1 | 10/2008 | Broadfoot et al. | |
| 2009/0006062 A1 | 1/2009 | Sedukhin et al. | |
| 2009/0013307 A1* | 1/2009 | Raghavan | G06F 17/5009 703/17 |
| 2009/0077511 A1 | 3/2009 | Wahler et al. | |
| 2009/0098349 A1 | 4/2009 | Ichikawa | |
| 2009/0193396 A1* | 7/2009 | Hartadinata | G06F 11/3664 717/125 |
| 2009/0234640 A1 | 9/2009 | Boegl et al. | |
| 2010/0299651 A1* | 11/2010 | Fainekos | G06F 11/362 717/104 |
| 2011/0078652 A1 | 3/2011 | Mani et al. | |
| 2011/0283260 A1 | 11/2011 | Bucuvalas | |
| 2011/0295578 A1 | 12/2011 | Aldrich et al. | |
| 2012/0179426 A1 | 7/2012 | Fontes et al. | |
| 2013/0326472 A1 | 12/2013 | Han et al. | |
| 2014/0358506 A1 | 12/2014 | Aldrich et al. | |

OTHER PUBLICATIONS

Clarke, et al., "Model checking and abstraction," ACM Transactions on Programming Languages and Systems, vol. 16, No. 5, Sep. 1994, pp. 1512-1542.

Fehnker, Ansgar & Krogh, Bruce "Hybrid System Verification Is Not a Sinecure: The Electronic Throttle Control Case Study" ATVA 2004, LNCS 3299, pp. 263-277.

Girard, et al., "Approximation metrics for discrete and continuous systems," University of Pennsylvania, Department of Computer & Information Science—Technical Reports (CIS), Nov. 2005, pp. 1-32.

Han, et al., "Detecting data store access conflict in Simulink by solving Boolean satisfiability problems," In American Control Conference (ACC'1 0), Jun. 2010, pp. 1-6.

Han, et al., "Reachability analysis of hybrid control systems using reduced-order models", In IEEE Proc of American Control Conference (ACC'04), Jun. 2004, pp. 1183-1189.

Han, et al., "Reachability analysis of nonlinear systems using trajectory piecewise linearized models," Proceedings of the 2006 American Control Conference, Jun. 14-16, 2006, pp. 1-6.

Heckel, "Graph transformation in a nutshell" Electron Notes Theory of Computer Science, Feb. 2006, pp. 187-198.

Johnson, et al., "The program structure tree: computing control regions in linear time," In Proceedings of the ACM SIGPLAN 1994 conference on Programming language design and implementation, PLDI '94, 1994, pp. 171-185.

Kaga, et al., "Validation of control software specification using design interests extraction and model checking," In SAE 2012 World Congress and Exhibition, Apr. 24, 2012, pp. 1-13.

Matsubara, et al., "Model checking with program slicing based on variable dependence graphs," In Workshop on Formal Techniques for Safety-Critical Systems, Nov. 2012, pp. 56-68.

"Notification of Transmittal of the International Search Report and the Written Opinion of the International Searching Authority, or the Declaration," International Filing Date: May 27, 2011, International Application No. PCT/US2011/000965, Applicant: The MathWorks, Inc., dated Oct. 6, 2011, pp. 1-10.

Pappas, "Bisimilar linear systems," Automatica 39, Jan. 2002, pp. 2035-2047.

Rewienski, et al., "A trajectory piecewise-linear approach to model order reduction and fast simulation of nonlinear circuits and micromachined devices," IEEE Transaction on Computer-Aided Design of Integrated Circuits and Systems, vol. 22, No. 2, Feb. 2003, pp. 155-170.

"Simulink® Designer Verifier 1: User's Guide," The MathWorks, Inc., May 2007, pp. 1-485.

"Simulink® Verification and Validation 2: User's Guide," The MathWorks, Inc., Sep. 2007, pp. 1-829.

TIP, "A survey of program slicing techniques," Journal of Programming Languages, vol. 3, 1995, pp. 121-189.

Weiser, "Program slicing," IEEE Transactions on Software Engineering, vol. SE-10, No. 4, Jul. 1984, pp. 352-357.

Reicherdt, Robert, et al., "Slicing MATLAB Simulink Models," ICSE 2012, Proceedings of the 34th International Conference on Software Engineering, Zurich, Switzerland, IEEE, Jun. 2-9, 2012, pp. 551-561.

Aldrich, William, "Using Model Coverage Analysis to Improve the Controls Development Process," AIAA Modeling & Simulation Technologies Conference & Exhibit, Monterey, CA, Aug. 5-8, 2002, pp. 1-11.

"Hinfnorm" Documentation Fact Sheet, MATLAB, The Math Works, Inc., found online at <http://www.mathworks.com/help/robust/ref/hinfnorm.html?s_tid=gn_loc_drop&requestedDomain=www.mathworks.com>, Introduced in R2013B, retrieved from the internet Sep. 12, 2016, 3 pages.

Kanade, Aditya, et al., "Generating and Analyzing Symbolic Traces of Simulink/Stateflow Models," Springer-Verlag Berlin Heidelberg, Proceedings of 21st International Conference on Computer Aided Verification, CAV 2009, available from <https://link.springer.com/chapter/10.1007/978-3-642-02658-4_33>, Jun. 26-Jul. 2, 2009, pp. 430-445.

Kwiatkowski, et al., "Automated Generation and Assessment of Affine LPV Models" Proceedings of the 45th IEEE Conference on Decision & Control, Manchester Grand Hyatt Hotel, San Diego, CA, USA, Dec. 13-15, 2006, 6 pages.

"LPV Approximation of a Boost Converter Model" Documentation Fact Sheet, MATLAB, The Math Works, Inc., found online at <http://www.mathworks.com/help/slcontrol/examples/lpv-approximation-of-a-boost-converter-model.html?searchHighlight=LPV>, R2016B, retrieved from the internet Sep. 12, 2016, 11 pages.

"Model Reduction" Documentation Fact Sheet, MATLAB, The Math Works, Inc., found online at <http://www.mathworks.com/help/control/model-simplification-1.html>, R2016B, retrieved from the internet Sep. 12, 2016, 1 page.

(56) References Cited

OTHER PUBLICATIONS

U.S. Appl. No. 14/958,726, filed Dec. 3, 2015 by Fu Zhang et al. for a Model Structure Analysis With Integration of Transformed Slice, pp. 1-91.
Hyde, R. A., et al., "Fostering Innovation in Design and Reducing Implementation Costs by Using Graphical Tools for Functional Specification," American Institute of Aeronautics and Astronautics, Inc., The MathWorks Ltd, Aug. 2002, pp. 1-10.
Mohapatra, Durga Prasad, et al., "An overview of Slicing Techniques for Object-Oriented Programs," The Slovene Society Informatika, Ljubljana, Slovenia, Informatica, vol. 30, No. 2, Jun. 2, 2006, pp. 253-277.
Li, Dongguang, et al., "Analysis of Dual-Rate Inferential Control Systems," Brief Paper, Elsevier Science Ltd, Pergamon, Automatica, vol. 38, Issue 6, Jun. 2002, pp. 1053-1059.
Yang, Guowei, et al., "Memoized Symbolic Execution," ACM, Proceedings of the 2012 International Symposium on Software Testing and Analysis, ISSTA '12, Minneapolis, MN, USA, Jul. 15-20, 2012, pp. 144-154.
Young, Nicholas, An Introduction to Hilbert Space: Chapter 2-Normed Spaces, Cambridge Mathematical Textbooks, ISBN 0-521-33717-8, Cambridge University Press, Cambridge, Great Britain, 1988, pp. 13-20.
Zhou, Kemin, et al., "Robust and Optimal Control: Chapter 7-Model Reduction by Balanced Truncation," Prentice Hall, Englewood Cliffs, New Jersey, ISBN 0-13-456567-3, 1996, pp. 153-168.
Tarjan, Robert, "Depth-First Search and Linear Graph Algorithms" Siam J. Comput., vol. 1, No. 2, Jun. 1972 available at http://langevin.univ-tln.fr/cours/PAA/extra/Tarjan-1972.pdf, pp. 146-160.
Karatoprak, Yusuf, "Difference Between loose Coupling and Tight Coupling," available at https://www.c-sharpcorner.com/UploadFile/yusufkaratoprak/difference-between-loose-coupling-and-tight-coupling/, Dec. 21, 2012, pp. 1-9.
"Coupling (computing programming)," Wikipedia, retrieved from <https://en.wikipedia.org/wiki/Coupling_(computer_programming)>, retrieved on Sep. 1, 2018, pp. 1-5.
Daoudi, M., "An Investigation Into a Probabilistic Framework for Studying Symbolic Execution Based Program Conditioning," Thesis, Department of Computing, Goldsmiths College, University of London, 2006, pp. 1-132.
Harman, M., et al., "Pre/Post Conditioned Slicing," IEEE Computer Society, Proceedings of the IEEE International Conference on Software Maintenance (ICSM'01), Nov. 7-9, 2001, pp. 1-10.
Silva, Josep, "A Vocabulary of Program Slicing-Based Techniques," ACM, ACM Computing Surveys, vol. 44, No. 3, Article 12, Jun. 2012, pp. 1-41.
Xu, Baowen, et al. "A Brief Survey of Program Slicing," ACM SIGSOFT Software Engineering Notes, vol. 30, No. 2, Mar. 2005, pp. 1-36.
Zanden, B., et al., "An Explanation-Based, Visual Debugger for One-Way Constraints," ACM, Proceedings of the 17th Annual ACM Symp. on User Interface Software & Tech. (UIST'04), Santa Fe, New Mexico, USA, vol. 6, Issue 2, available from <https://dl.acm.org/citation.cfm?id=1029670>, Oct. 24-27, 2004, pp. 207-216.
Herzner, W., et al., "Model-based Development of Distributed Embedded Real-Time Systems iwth the DECOS Tool-Chain" SAE Int'l (2007) available from <http://saemobilus.sae.org/content/2007-01-3827> (year: 2007).

\* cited by examiner

| COMPONENT NAME 902 | COMPATIBLE 904 | ANALYSIS TIME (seconds) 906 | TOTAL OBJECTIVES 908 | SATISFIED OBJECTIVES 910 | SATISFIED OBJECTIVES WITHOUT TEST CASE 912 | FALSIFIED OBJECTIVES (PROVEN UNSATISFIABLE) 914 | OBJECTIVES PRODUCING ERRORS 916 | UNDECIDED OBJECTIVES 918 |
|---|---|---|---|---|---|---|---|---|
| fuel_rate_controller/ controller/ control logic | Y ~920a | 1 | 109 | 59 | 0 | 0 | 0 | 50 |
| fuel_rate_controller/ controller/ SensorCorrection and FaultRedundancy | Y ~920b | 0 | 12 | 12 | 0 | 0 | 0 | 0 |
| fuel_rate_controller/ controller/ FuelCalculation | N ~920c | NA | NA | NA | NA | NA | NA | NA |
| fuel_rate_controller/ controller/ FuelCalculation/ SwitchableCompensation | Y ~920d | 0 | 17 | 17 | 0 | 0 | 0 | 0 |
| fuel_rate_controller/ controller/ AirflowCalculation | Y ~920E | 1 | 6 | 6 | 0 | 0 | 0 | 0 |

FIG. 9

PARTITIONING BLOCK DIAGRAMS INTO EXECUTABLE CONTEXTUAL MODELS

CROSS-REFERENCE TO RELATED APPLICATIONS

This application is a divisional of application Ser. No. 13/117,936 filed May 27, 2011 for DETERMINING MODEL COMPONENTS SUITABLE FOR VERIFICATION ANALYSIS, which claims the benefit of U.S. Provisional Patent Application Ser. No. 61/348,969 filed May 27, 2010, by William J. Aldrich, Ebrahim Mehran Mestchian, and Denizhan N. Alparslan for PARTITIONING BLOCK DIAGRAMS INTO EXECUTABLE CONTEXTUAL MODELS, which applications are hereby incorporated by reference in their entireties.

BRIEF DESCRIPTION OF THE DRAWINGS

The invention description below refers to the accompanying drawings, of which:

FIG. 9 is a schematic illustration of a report that can be generated in accordance with an embodiment of the invention;

DETAILED DESCRIPTION OF ILLUSTRATIVE EMBODIMENTS

Figure 1:
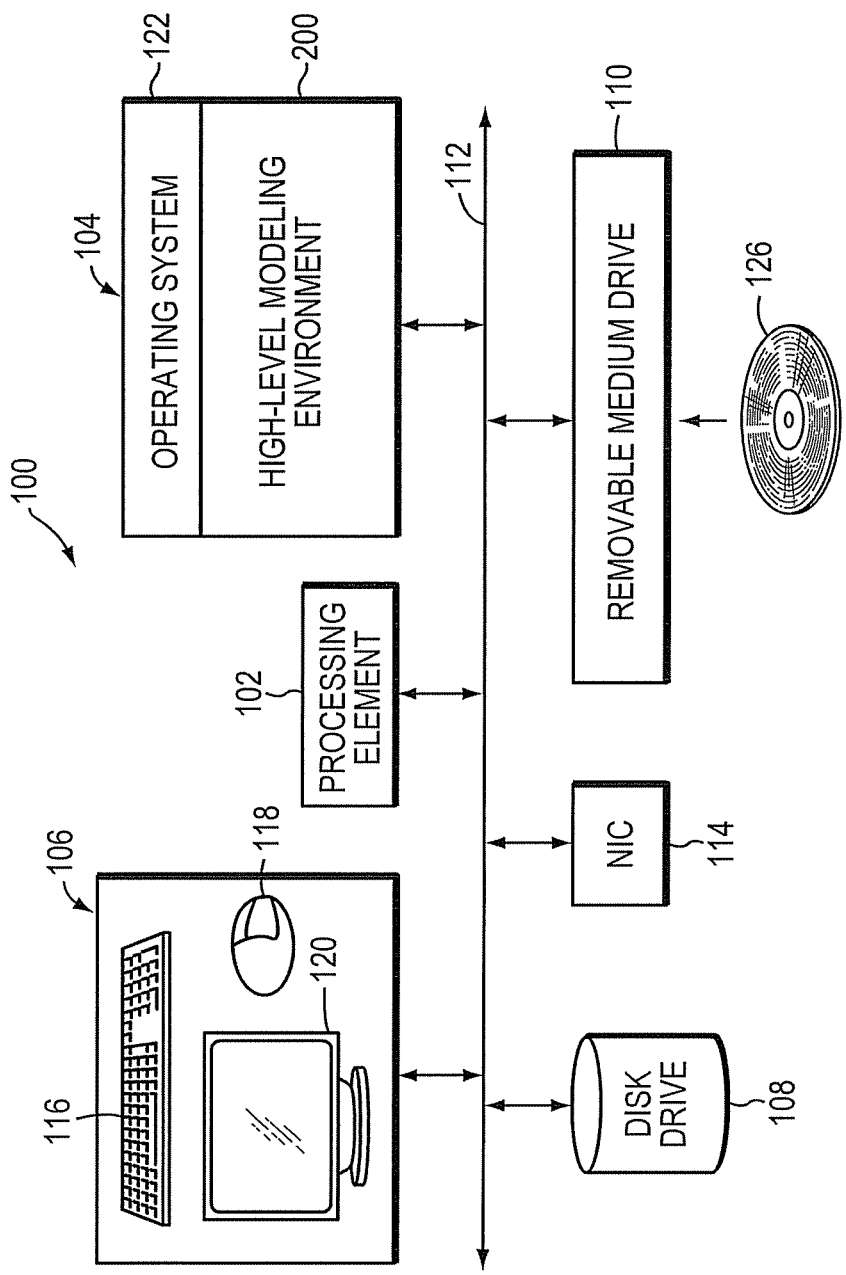
FIG. 1 is a schematic illustration of a data processing system.

Computer generated models having executable semantics may be used to simulate physical systems. For example, a graphical model may be used to represent a complex control system for a manufacturing plant. The graphical model may include entities, such as blocks, that reference executable code for performing operations of the control system when the graphical model executes. Blocks can vary in type and/or number, and may have input and output ports so that they may be connected together to build large, complex models (e.g., models including hundreds or more interconnected blocks). A set of blocks may be organized into a subsystem, and replaced in the graphical model with a single subsystem block having its own input and output ports. Replacing sets of blocks with a subsystem reduces the visual complexity of the model, improving its readability. A model may be executed in a modeling environment. During model execution, dynamic behavior of the model may be represented through dynamic updates to its states.

Users may want to analyze models. For example, a user may need to run analysis tools or inspect some or all of the components in a model in order to better understand and/or improve its behavior. Such inspection may include analysis prior, during and/or after execution of the model.

Analysis of the model or its component may include verification. A verification application may be used to facilitate such analysis. The verification application may, for example, inspect the section of the model it is analyzing for compliance with predetermined standards.

Overview

Exemplary embodiments can be used to perform model verification. A model, such as a computer-generated, graphical model, having executable semantics may be created to represent a system, such as a dynamic system. During execution, the model may receive one or more inputs, and may produce one or more results. In addition to executing the model, computer programming code, such as C, C++, or hardware description language (HDL) code, among others, may be generated from the model, and this generated code, which may be in the form of object code, may be executed. A model may include a plurality of interconnected model elements. Groups of model elements may be organized into subsystems and subcharts. Furthermore, subsystems and subcharts may be configured for atomic execution. Atomic subsystems, atomic subcharts, and remote, external models that are referenced from within a source model may be referred to as model components, or more simply components. Model elements, subsystems, subcharts, and components may be organized in a model hierarchy within the model. For example, the model may include a top-level and one or more lower levels. A component at a first level of the model may include one or more components at a next lower level, and so on.

A verification system may include an analysis engine having one or more analysis modules, an iteration engine, a contextual information extraction engine, a visualization engine, and a report generator. The model iteration engine may analyze the model, and automatically discover model components that are suitable for one or more model verification analysis techniques. That is, the model iteration engine may determine which components of the model are analyzable by a given verification analysis technique. Exemplary techniques include design error detection, test case generation, and static range analysis. Design errors that may be detected include data overflow, data underflow, and division-by-zero. Test case generation may be based on functional requirements and/or model coverage objectives. Ranges that may be derived by static range analysis include minimum and maximum range values for signals and parameters in the model. The model iteration engine may also identify a largest set of hierarchically nested model components that can be successfully analyzed by the given verification analysis technique. The iteration engine may have a plurality of settable parameters that are used during the evaluation of the model. These settable parameters may be adjusted, for example, by a user or programmatically, to change the determination of analyzable components.

The identity of the model components that make up the largest set may be provided to a model builder. The model builder may create a separate model having executable semantics, which may be referred to as a contextual model. The contextual model may include just the model components from the largest set. The analysis engine may perform verification analysis on this contextual model.

The contextual information extraction engine may monitor the execution of a received model where the execution is subject to one or more specified constraints. The contextual information extraction engine may identify one or more model elements that satisfy a specified interaction behavior with a target element of the model, while the model is executed subject to the one or more specified constraints. The visualization engine may provide one or more visual cues to assist in identifying the one or more model elements found to satisfy the specified interaction behavior with the target element.

FIG. 1 is a schematic illustration of a computer or data processing system 100 for implementing and utilizing an embodiment of the invention. The computer system 100 includes one or more processing elements, such as a processing element 102, a main memory 104, user input/output (I/O) 106, a data storage unit, such as a disk drive 108, and a removable medium drive 110 that are interconnected by a system bus 112. The computer system 100 may also include a communication unit, such as a network interface card (NIC) 114. The user I/O 106 may include a keyboard 116, a pointing device, such as a mouse 118, and a display 120. Exemplary processing elements include single or multi-core Central Processing Units (CPUs), Graphics Processing Units (GPUs), Field Programmable Gate Arrays (FPGAs), Application Specific Integrated Circuits (ASICs), etc.

The main memory 104 may store a plurality of libraries or modules, such as an operating system 122, and one or more applications running on top of the operating system 122, including a high-level modeling environment 200.

The removable medium drive 110 may accept and read a computer readable medium 126, such as a CD, DVD, floppy disk, solid state drive, tape, flash memory or other medium. The removable medium drive 110 may also write to the computer readable medium 126.

Suitable computer systems include personal computers (PCs), workstations, laptops, tablets, palm computers and other portable computing devices, etc. Nonetheless, those skilled in the art will understand that the computer system 100 of FIG. 1 is intended for illustrative purposes only, and that the present invention may be used with other computer systems, data processing systems or computational devices. The present invention may also be used in a networked, e.g., client-server, computer architecture, or a public and/or private cloud computing arrangement.

Suitable operating systems 122 include the Windows series of operating systems from Microsoft Corp. of Redmond, Wash., the Linux operating system, the MAC OS® series of operating systems from Apple Inc. of Cupertino, Calif., and the UNIX® series of operating system, among others.

As indicated above, a user or developer, such as an engineer, scientist, programmer, etc., may utilize the keyboard 116, the mouse 118, and the display 120 to operate the high-level modeling environment 200, and construct one or more models of a system that is being designed.

In an embodiment, suitable high-level modeling environments include the MATLAB® and SIMULINK® technical computing environments from The MathWorks, Inc. of Natick, Mass., the Stateflow charting tool from The MathWorks, Inc., the LabVIEW programming system from National Instruments Corp. of Austin, Tex., the Visual Engineering Environment (VEE) from Agilent Technologies, Inc. of Santa Clara, Calif., a Unified Modeling Language (UML) system, a Systems Modeling Language (SysML) system, and the System Generator System from Xilinx, Inc. of San Jose, Calif., among others. The high-level modeling environment may thus operate at a level that is even higher than certain programming languages, such as the C, C++, and C# programming languages.

Those skilled in the art will understand that the MATLAB® technical computing environment is a math-oriented, textual programming environment for digital signal processing (DSP) design, among other uses. The SIMULINK® technical computing environment is a graphical, block-based environment for modeling and simulating dynamic systems, among other uses.

In another embodiment, a lower level programming language, such as the C, C++, and C# programming languages, among others, may be used to create the model instead of a high-level modeling environment.

Figure 2:
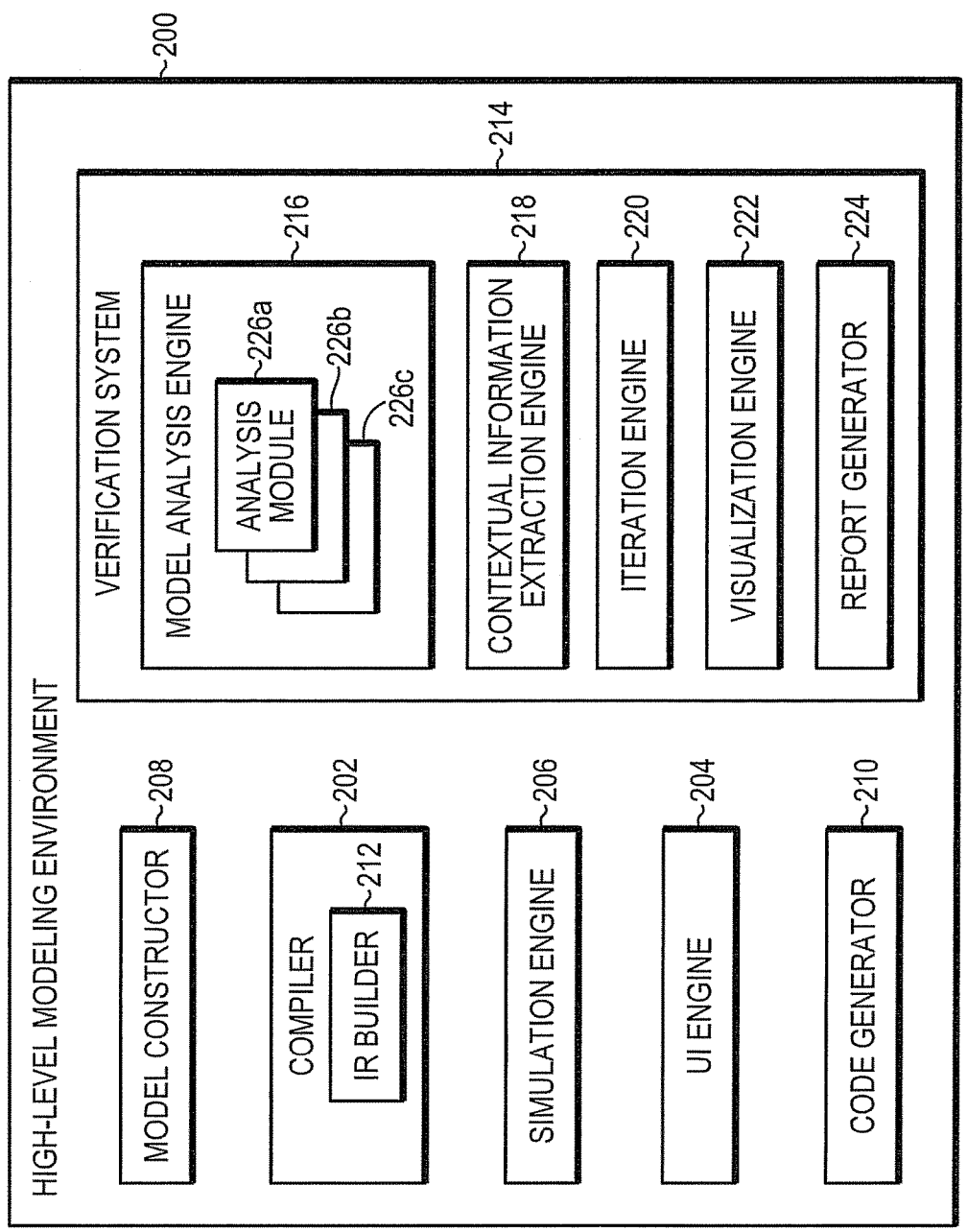
FIG. 2 is a partial, functional diagram of a high-level modeling environment.

FIG. 2 is partial block diagram of an embodiment of the high-level modeling environment 200. The environment 200 may include a compiler 202, a user interface (UI) engine 204, a simulation engine 206, a model constructor 208, and a code generator 210. The compiler 202 may include one or more Intermediate Representation (IR) builders, such as IR builder 212.

In an embodiment, a verification system 214 may be integrated with the high-level modeling environment 200. For example, the verification system 214 may be implemented as an add-on tool to the environment 200, or it may be built-into the environment 200, among other options. Alternatively, the verification system 214 may be separate from the high-level modeling environment 200, but in communicating relationship with it. The verification system 214 may include a plurality of components or modules. In particular, the system 214 may include a model analysis engine 216, a contextual information extraction engine 218, an iteration engine 220, a visualization engine 222, and a report generator 224. The model analysis engine 216 may include one or more verification modules, such as verification modules 226a-c.

In an implementation, high-level modeling environment 200 may receive inputs by a user as the user creates, edits, revises, and/or opens one or more models, as indicated by arrow 228. The model created by the user may be a Simulink model, a Stateflow chart, a LabVIEW block diagram, a VEE diagram, a MATLAB file, etc. The model may represent a dynamic system, such as an aircraft flight controller, an engine control unit (ECU), an embedded system, etc. The simulation engine 206 simulates, e.g., executes, the model. That is, icons or blocks of the model may represent computations, functions, operations, or states, and interconnecting lines or arrows among those blocks may represent data, signals, events, or mathematical relationships among those computations, functions, operations, or states. The icons or blocks may be selected by the user from one or more libraries or palettes that contain icons for the blocks supported by the high-level modeling environment 200.

The UI engine 204 may provide or support a graphical user interface (GUI) having a Run button that may be selected by the user. The UI engine 204 may also provide or support a Command Line Interface (CLI) that may receive a run command entered by the user. In response to the user selecting the Run button or entering the run command, the simulation engine 206 may execute or run the model, and may present the results generated by the model's execution to the user via the display 120.

The UI engine 204 may also provide or support a Code Generation button or option that may be selected by the user, or the UI engine 204 may receive a code generation command entered by the user, e.g., in the GUI or the CLI. In response to the user selecting the Code Generation button or entering the code generation command, the code generator 210 may generate code for at least part of the model, and may store the results of the code generation operation in memory. For example, the code generator 210 may produce computer programming code, or hardware description code corresponding to the model created by the user, as indicated by arrow 224. Exemplary computer programming code includes C code, C++ code, etc., and exemplary hardware description code includes VHDL, Verilog, SystemC, embedded MATLAB, and vendor or target specific HDL code, such as Xilinx FPGA libraries, etc.

In an embodiment, suitable code generators for use with the present invention include the Real Time Workshop product and the Simulink HDL Coder product both from The MathWorks, Inc. Suitable model analysis engines for use with the present invention include the Simulink Design Verifier Simulink Verification and Validation products both from The MathWorks, Inc. Another example of a suitable code generator is the TargetLink product from dSpace GmbH of Paderborn Germany. Another example of a model analysis engine is the Embedded Validator product from BTC Embedded Systems AG of Oldenburg Germany. Those skilled in the art will understand that other code generation systems and model analysis engines may be used.

The high-level modeling environment 200 may further include one or more debugging facilities (not shown) that may, for example, allow halting a simulation at one or more breakpoints. A breakpoint may be specified for a variable, for example, to halt execution when the variable value changes. A breakpoint also may be conditional, for example, only halting execution when a variable value changes and the current time of execution is in a certain time interval, or only halting execution when a variable has changed a specified number of times.

The model analysis engine 216, contextual information extraction engine 218, iteration engine 220, visualization engine 222, report generator 224, and analysis modules 226 may each comprise registers and combinational logic configured and arranged to produce sequential logic circuits. In an embodiment, the model analysis engine 216, contextual information extraction engine 218, iteration engine 220, visualization engine 222, report generator 224, and analysis modules 226 may be implemented through one or more software modules or libraries containing program instructions pertaining to the methods described herein. The software modules may be stored on main memory 104 and/or computer readable media, such as computer readable medium 126, and executable by one or more processing elements, such as processing element 102. Other computer readable media may also be used to store and execute these program instructions. In alternative embodiments, various combinations of software and hardware, including firmware, may be utilized to implement the present invention. In response to the user inputs, the model constructor 207 may build a model that may be presented to the user, for example, on the display 120.

Model Iteration

Figure 3A:
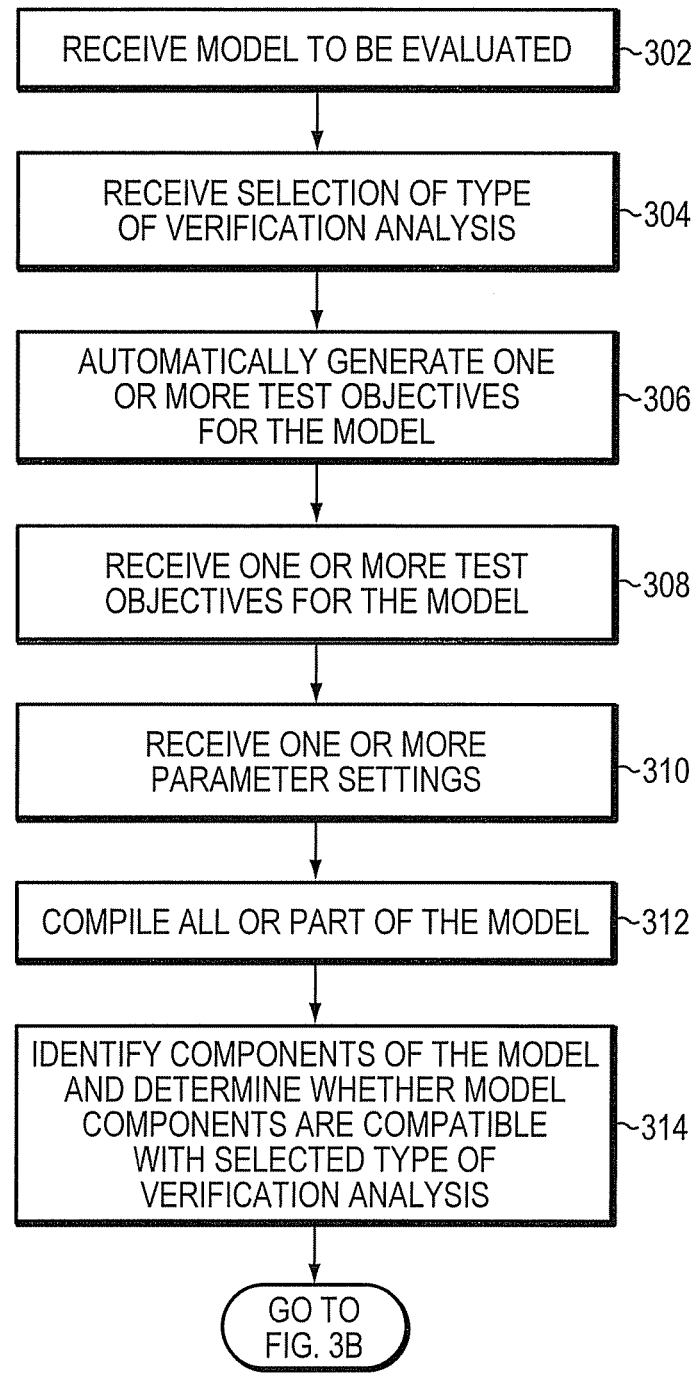
FIGS. 3A-C are partial views of a flow diagram of exemplary processing that can be used in accordance with an embodiment of the invention.
Figure 3B:
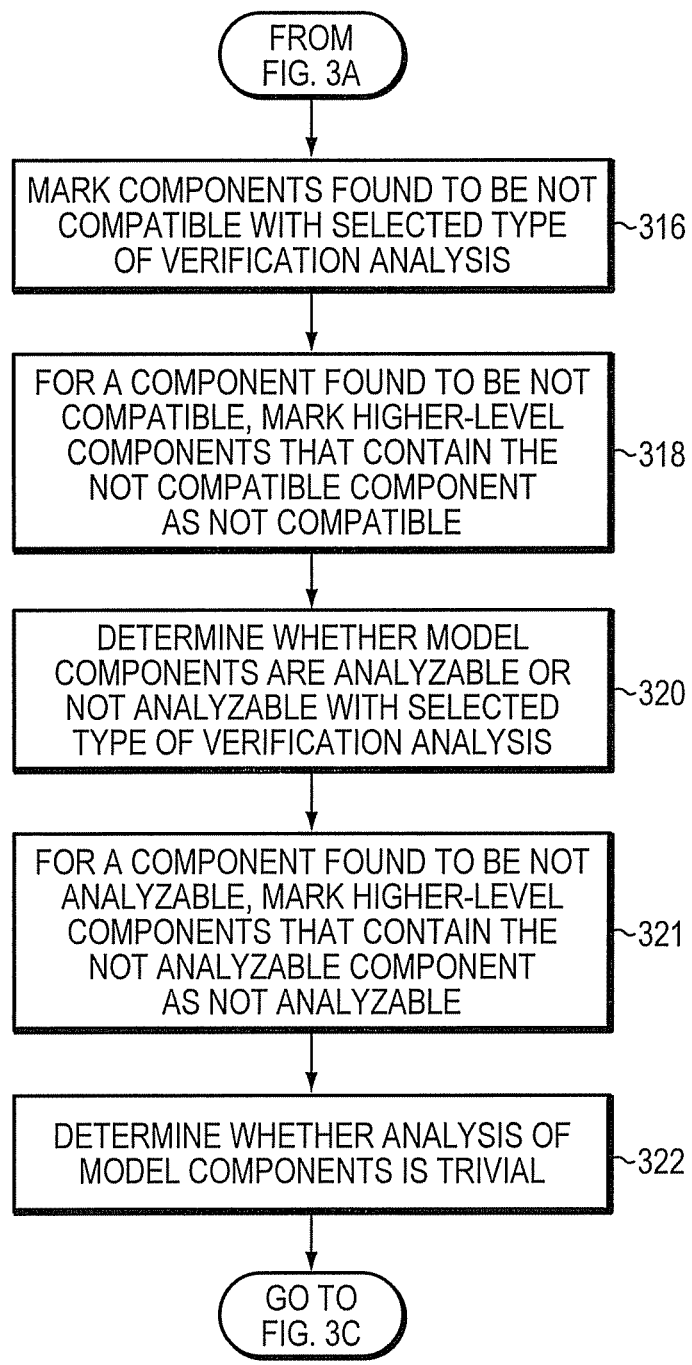
Figure 3C:
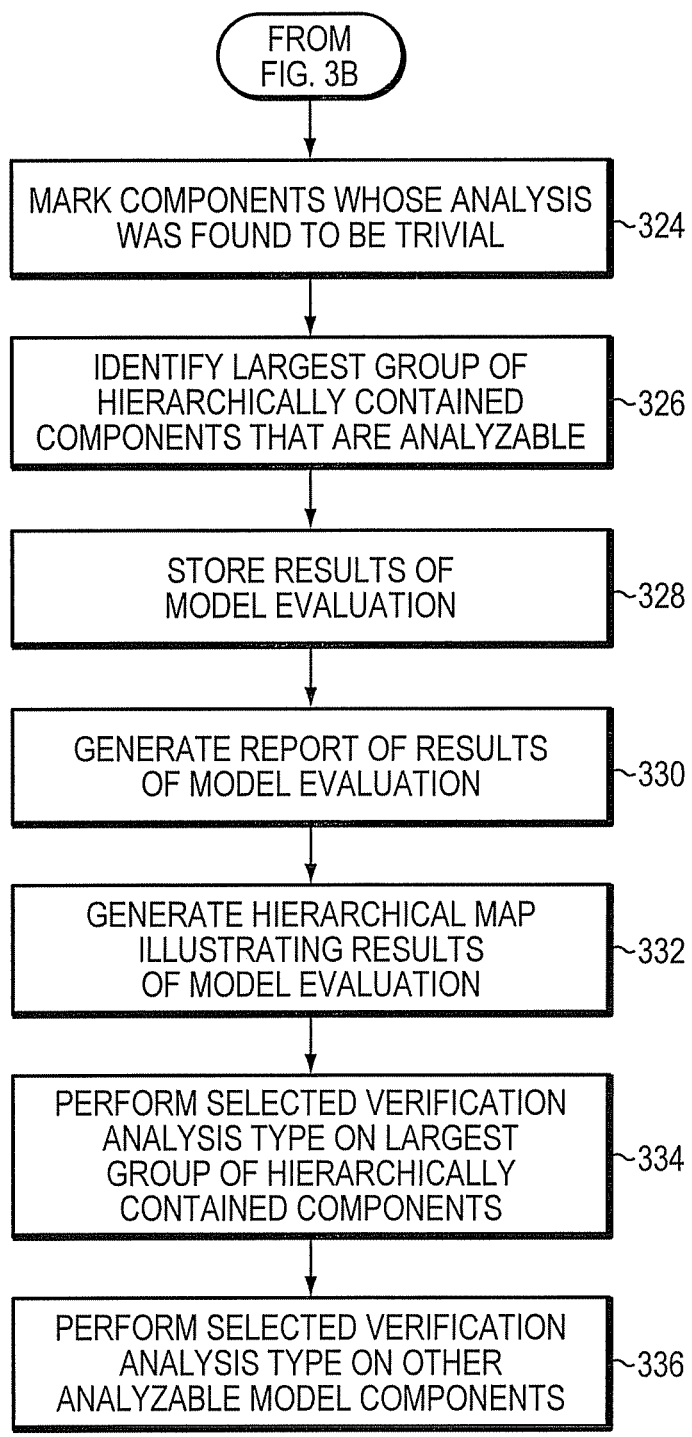

FIGS. 3A-C are partials views of a flow diagram of exemplary processing in accordance with an embodiment of the invention. The high-level modeling environment 200 may receive inputs from a user constructing or opening a model, as indicated at block 302. Environment 200 may support the creation of graphical, text-based, or a combination of graphical and text-based models. The user may operate and interact with environment 200 through the user I/O 106, such as the keyboard 116, mouse 118, and display 120. For example, the UI engine 204 may present a model editor on the display 120. The model editor may include a menu bar, a tool bar, a canvas, and one or more palettes of available blocks. The user may select one or more blocks from one or more palettes, and place them on the canvas. The user may then connect the blocks, e.g., with arrows, thereby establishing mathematical or other relationships among the blocks displayed on the canvas.

A graphical model may include a plurality of model elements. Exemplary model elements include blocks, states, and connections, among others. A set of interconnected blocks may be organized into a subsystem, and a set of states may be organized into a subchart. A subsystem or subchart may be designated to execute as an atomic unit. A component of a model is an atomic subsystem, an atomic subchart, or a separate model that is referenced from within a source model, for example, through a model reference block.

Figure 4:
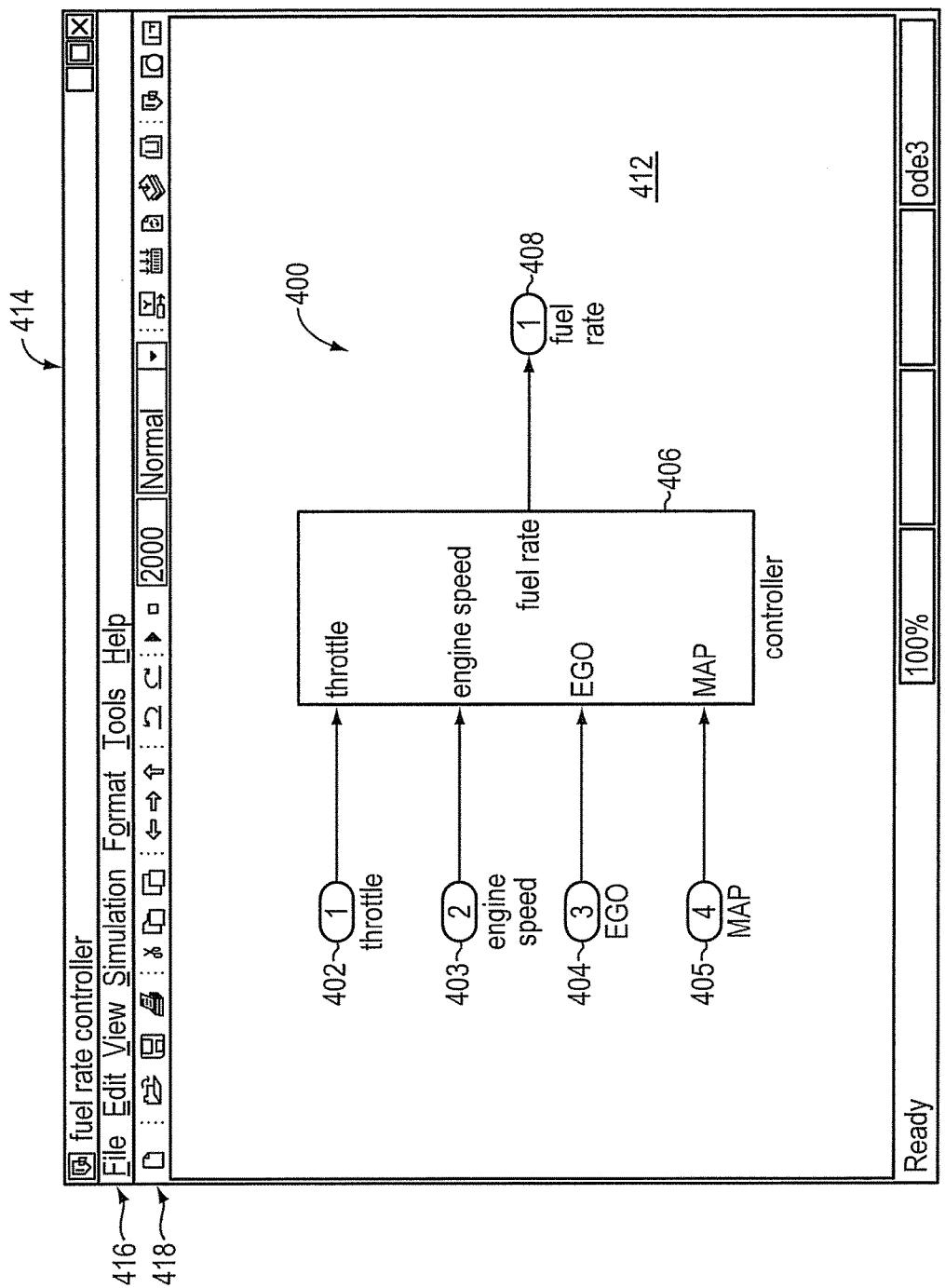
FIG. 4 is an illustration of a graphical model having executable semantics.

FIG. 4 is a schematic illustration of a computer-generated, executable graphical model 400. The model 400 includes four Inport blocks 402-405, a Controller subsystem 406, and an Outport block 408. The relationship among the components and blocks of the model 400, as represented graphically by the connecting arrow elements, may depend on the kind or type of model. For example, in a time-based modeling system, an arrow element may represent a mathematical relationship between two connected blocks where a first, e.g., upstream, block updates the signal, and a second, e.g., downstream, block reads the signal. In other modeling environments, the arrow or line elements may represent data flow, control flow, events, mechanical relationships, etc. The model 400 may be constructed on or opened in a model canvas 412 of a model editor 414. The model editor 414 may further include a menu bar 416 and a toolbar 418.

Figure 5:
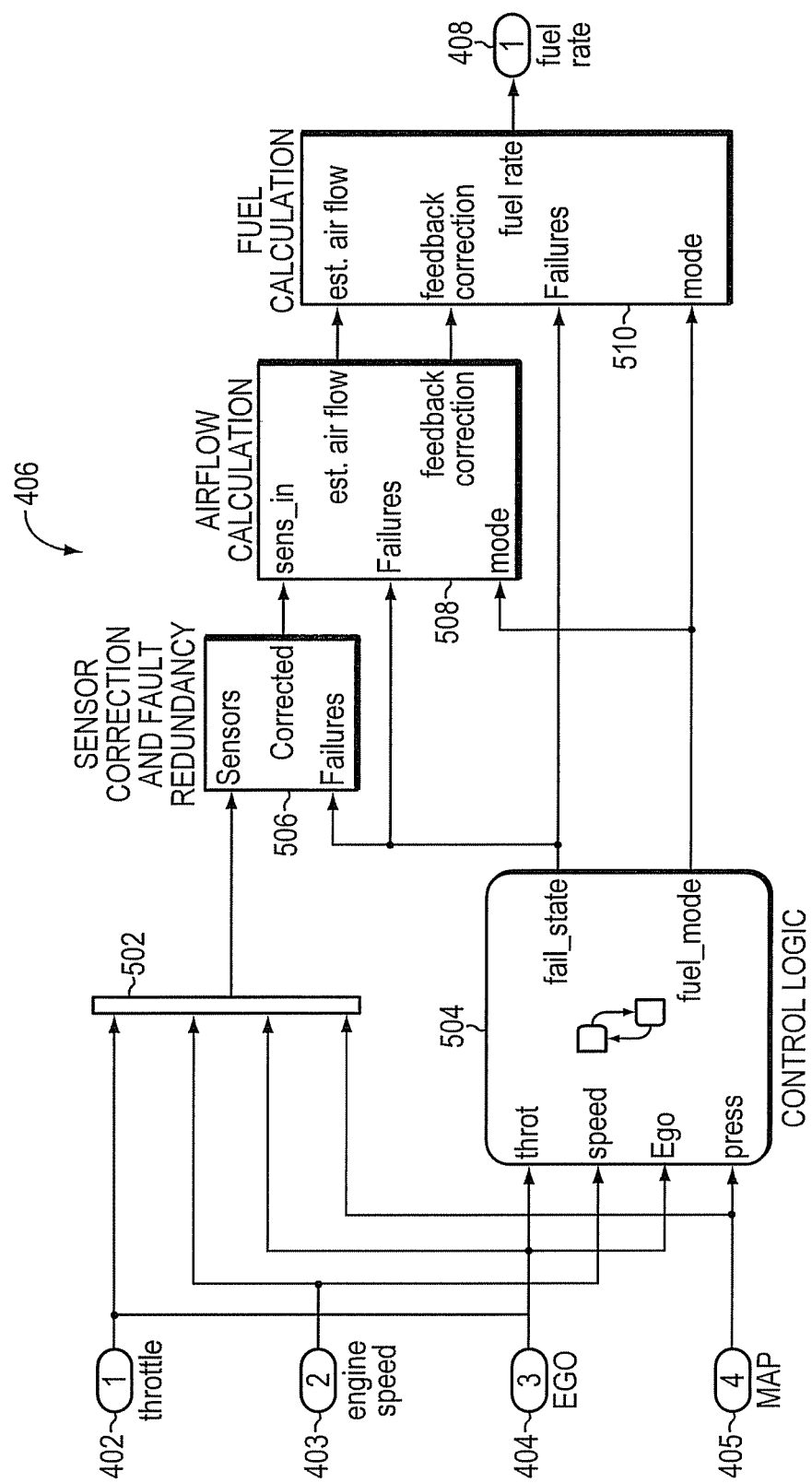
FIG. 5 is an illustration of an element of the graphical model of FIG. 4.

The model 400 as shown in FIG. 4 may be a root model that is located at a top or highest level of model hierarchy. The model 400 includes model elements, such as subsystems, blocks, charts, and subcharts, at lower levels of the model hierarchy. Specifically, the Controller subsystem 406 may be a component, e.g., configured to operate as an atomic unit, and may include other model elements. FIG. 5 is a schematic illustration of the Controller component 406 as shown at the next lower level of the model hierarchy, for example Level 1, relative to the top level. The Controller component 406 includes a Bus block 502, a Control Logic statechart 504, a Sensor Correction and Fault Redundancy subsystem 506, an Airflow Calculation subsystem 508, and a Fuel Calculation subsystem 510. The Control Logic statechart 504, Sensor Correction and Fault Redundancy subsystem 506, Airflow Calculation subsystem 508, and Fuel Calculation subsystem 510 may each be configured to operate as atomic units, and thus represent respective components of the model 400. In addition, these components may contain one or more other model elements located at a next lower level.

Figure 6:
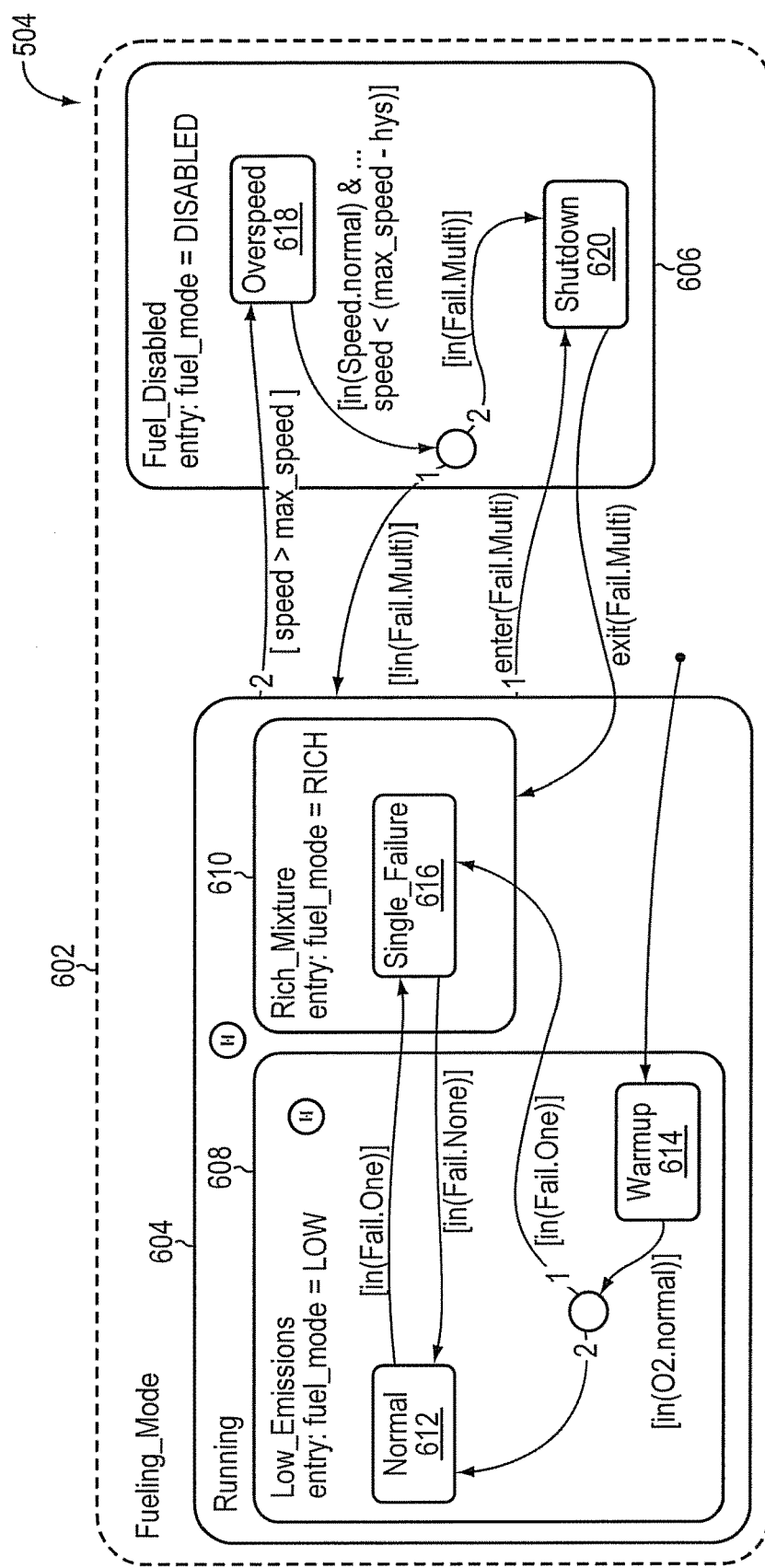
FIG. 6 is a partial illustration of another element the graphical model of FIG. 4.

FIG. 6 is a partial schematic illustration of the Control Logic statechart 504 as shown at the next lower level of the model hierarchy, i.e., Level 2. The Control Logic statechart 504 may include a Fueling_Mode subchart 602 that, in turn, includes a Running substate 604 and a Fuel_Disabled substate 606. The Running substate 604 includes a Low_Emissions substate 608 and a Rich_Mixture substate 610. The Running substate 604 includes a Normal state 612 and a Warm-up state 614. The Rich_Mixture substate 610 includes a Single_Failure state 616. The Fuel_Disabled substate 606 includes an Overspeed state 618 and a Shutdown state 620.

Figure 7:
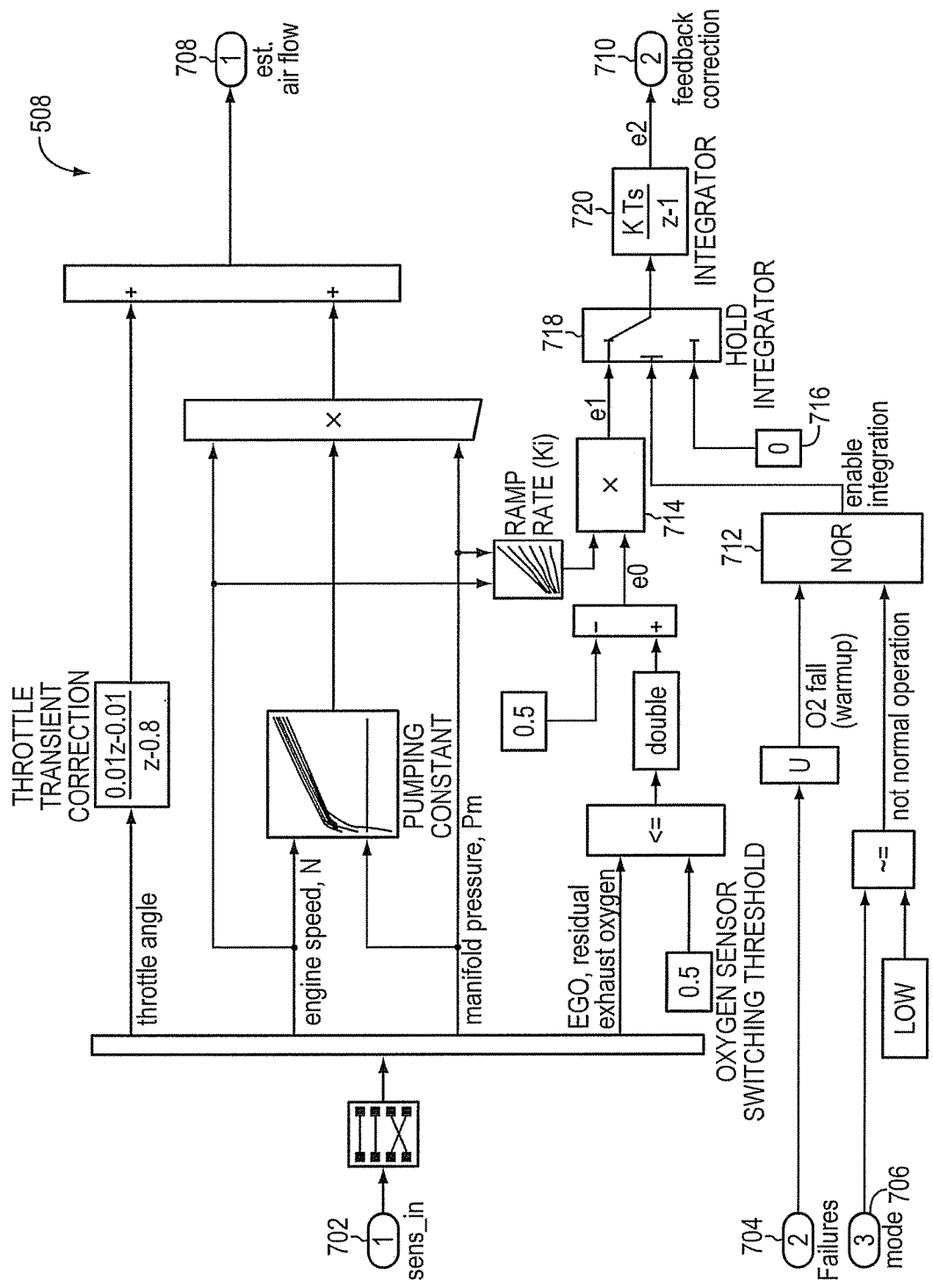
FIG. 7 is an illustration of a further element of the graphical model of FIG. 4.

FIG. 7 is a schematic illustration of the Airflow Calculation component 508 also as shown at Level 2 of the model hierarchy. The Airflow Calculation component 508 includes a plurality of model elements. Specifically, the Airflow Calculation component 508 includes a Sensors_In (sens_in) Inport 702, a Failures Inport 704, a Mode Inport 706, an Estimated Air Flow (est. air flow) Outport 708, and a Feedback Correction Outport 710. The Airflow Calculation component 508 further includes a logical NOR block 712, a Product block 714, a Constant block 716, a Switch block (labeled Hold Integrator) 718, and an Integrator block 720, among others.

Figure 8:
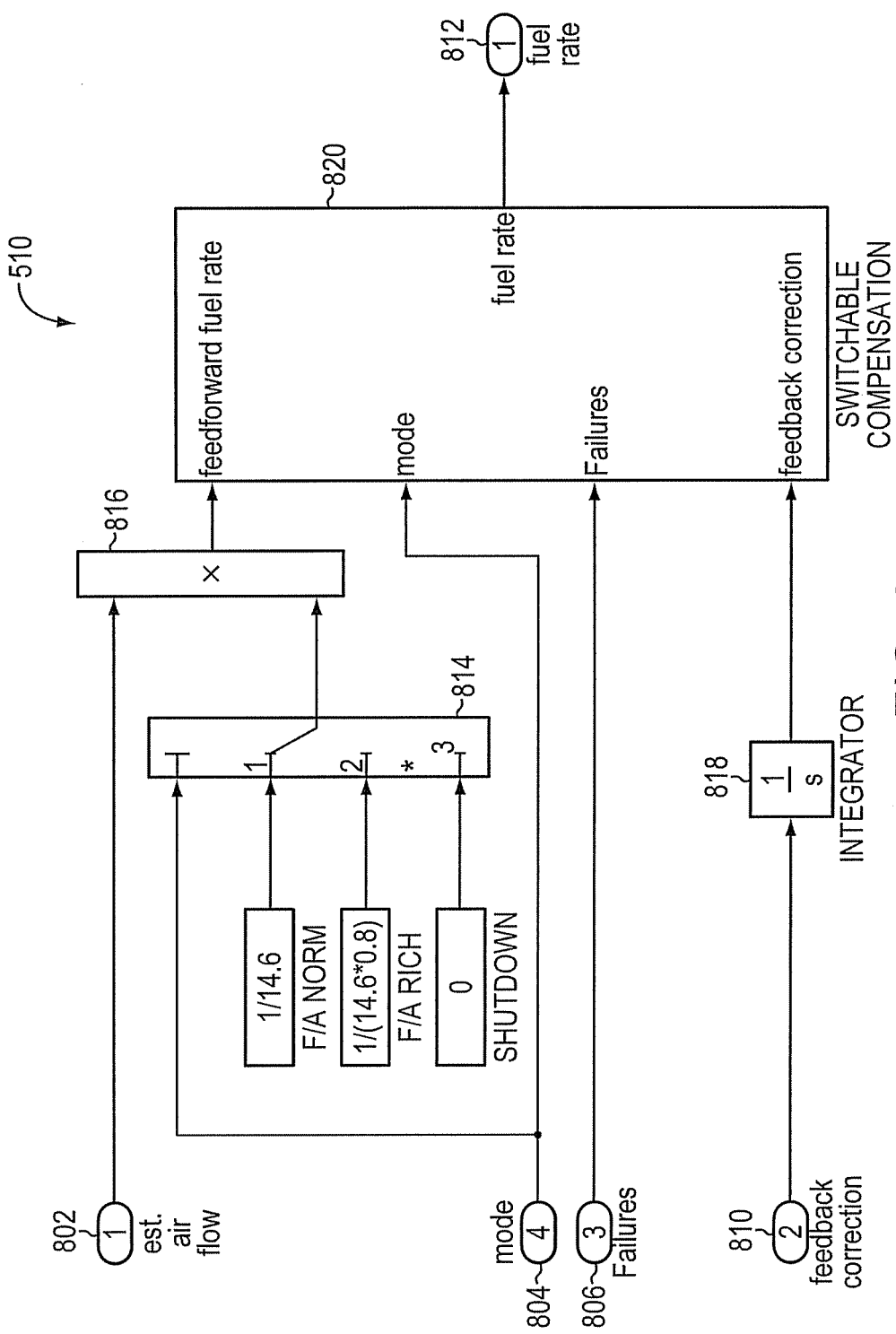
FIG. 8 is an illustration of yet another element of the graphical model of FIG. 4.

FIG. 8 is a schematic illustration of the Fuel Calculation component 510 as shown at the next lower level of the model hierarchy, i.e., Level 2. The Fuel Calculation component 510 includes an Estimated Air Flow (est. air flow) Inport 802, a Mode Inport 804, a Failures Inport 806, a Feedback Correction Inport 810, and a Fuel Rate Outport 812. The Fuel Rate Calculation component 510 also includes a Switch block 814, a Product block 816, an Integrator block 818, and a Switchable Compensation component 820, among other model elements.

It should be understood that the model 400 (FIG. 4) itself may be a component of an even larger model or may be a model referenced by an even larger model, such as a model of a fuel system.

The verification system 214 may receive a selection of a particular type of verification analysis to be performed on the model, as indicated at block 304. In an embodiment, types of verification analysis supported by the verification system 214 may include design error detection, test case generation, and static range analysis. Design errors that may be detected include data overflow, data underflow, and/or division-by-zero. Test case generation may be based on functional requirements and/or model coverage objectives, such as condition, decision, and modified condition/decision (MCDC), and signal range. Ranges that may be derived by static range analysis include minimum and maximum range values for signals and parameters in the model. The particular type of verification analysis may be user-selected through a configuration window presented on display 120 by the UI engine 204, and this selection may be received by the verification system 214. Alternatively, a particular model verification analysis technique may be used by default or selected by programmatically.

The model analysis engine 216 may determine automatically one or more test objectives for the model 400, as indicated at block 306. The number and kind of test objectives that are automatically determined may depend on the type of verification analysis that is to be performed. For example, if test cases are to be generated based on decision coverage of the model, the model analysis engine 216 may automatically determine the number of simulation paths through the elements of the model, and create a test objective for all or at least some of the simulation paths. A switch block, such as switch block 814 (FIG. 8), may have several simulation paths, and a test objective may be created for each such path through the switch block 814. For condition coverage, the model analysis engine 216 may automatically identify any logic blocks in the model, such as NOR block 712 (FIG. 7), and create a first test objective in which the block's output is True, and a second test objective in which the block's output is False.

In addition to automatically creating test objectives, the model analysis engine 216 may receive one or more test objectives, as indicated at block 308. For example, a user may define one or more test objectives to be used by the model analysis engine 216.

The verification system 214 may receive one or more parameter settings to be used during the evaluation of the model 400, as indicated at block 310. In an embodiment, a textual command may be entered by a user through a Command Line Interface (CLI) to evaluate a model. The CLI may be provided by the UI engine 204. For example, a textual command having the following format may be entered by a user in the CLI:

results=iterate (model, options), where

'results' is a variable name that stores the results of the evaluation of the model, 'iterate' is a function name that causes the model to be evaluated, 'model' is the identity, e.g., name, of the model or component to be evaluated, and 'options' is a variable name that contains values for one or more settable properties of the 'iterate' function.

The settable options may include:

'MaximumProcessingTime'—for specifying a maximum amount of time, e.g., in seconds, that is to be spent evaluating any given component of the model. A default value may be 100 seconds.

'ModelCoverageObjectives'—for specifying the selected analysis technique, e.g., Decision, Condition, or Modified Condition Decision.

'MaximumTestCaseSteps'—for specifying a maximum number of simulation time steps to be taken when attempting to satisfy a test objective. A default value may be 60.

'MaximumUndecidedRatio'—for specifying a ratio of undecided test objectives to total test objectives for use in determining whether a component will be deemed not analyzable. A default value may be 0.2.

'MaximumObjectiveErrorRatio'—for specifying a ratio of test objectives producing errors to total test objectives for use in determining whether a component will be deemed not analyzable. A default value may be 0.1.

'MinimumNumberObjectives'—for specifying a minimum number of test objectives that should exist in a component so that it will be analyzed. A default value may be 1.

It should be understood that greater or fewer settable options may be provided. For example, additional settable options may be provided for enabling block replacement, for selecting a rule set for performing block replacement, for enabling the use of model parameters and constraints, for specifying a file containing model parameters and constraints, for applying one or more optimizations, such as combining test objectives, for specifying whether test objectives satisfied in coverage data may be ignored during evaluation of the model, for specifying a file containing coverage data, for identifying base workspace parameters, for specifying a handle of a function for generated constraints on base workspace parameters, for enabling the performance of verification analysis on the model, for enabling output data, and for specifying output data formats.

Evaluation of the model 400 may begin with the compilation of the model, which may convert the model into an executable form. Specifically, the compiler 202 may compile all or part of the model 400, as indicated at block 312. Compilation of the model 400 may include preparing data structures and evaluating parameters to determine their values, determining block connectivity, propagating signal attributes, checking model component and block signal compatibility, flattening the model hierarchy, performing block reduction and insertion and other optimizations, and determining a block sorted order. In a link phase, memory, such as main memory 104 (FIG. 1), may be allocated for signals, states, and run-time parameters, and method execution lists may be created from the sorted order. In addition, the IR builder 212 may build an in-memory representation of the model 400, such as an intermediate representation (IR). The IR may be implemented as a graph, such as a data, control, call or data/control/call flow graph, that include a plurality of nodes, which may represent the blocks of the model, and edges, which represent connections, such as signals, within the model. The compiler 202 may apply one or more optimization techniques to the IR. Following the application of an optimization technique, an additional IR may be generated. In an embodiment, the verification system 214 may evaluate the model 400 by examining one or more of the IRs.

The model analysis engine 216 may identify each component within the model, and may determine whether one or more of the components are compatible with the verification system 214, as indicated at block 314. In particular, there may be one or more model features that are not supported by the verification system 216. For example, for dynamic systems models that are solved, e.g., with differential equation techniques, at successive time steps over a specified time span, the verification system 214 may not support the use of a variable-step, as opposed to a fixed-step, solver. The verification system 214 may not support the use of model callback functions. The verification system 214 may not support algebraic loops in a model or component. The verification system 214 may not support a model or component that has complex or variable-size signals. The verification system 214 may not support the use of nonfinite data. The verification system 214 may not support blocks that use continuous-time, such as certain Integrator blocks. The verification system 214 may not support one or more block types, such as certain trigonometric blocks, non-deterministic blocks, such as a Random Number Generator bloc, blocks that utilize unavailable compiled code, blocks that redirect to separate executables, blocks that rely on indirections with pointers that utilize pointer arithmetic.

In an embodiment, the verification system 214 may include a plurality of separate analysis techniques, and one or more model constructs or block types may not be compatible with a subset of these techniques.

The model analysis engine 216 may mark the one or more components of the model 400 that are not compatible with the verification system 214, as indicated at block 316. For each component of the model 400 that is marked as being not compatible with the verification system 214, the model analysis engine 216 also may mark all higher-level components within the model hierarchy that contain a component found to be not compatible without separate evaluation, as indicated at block 318. For example, suppose that the model analysis engine 216 determines that the Fuel Calculation component 510 (FIG. 5) is not compatible because it includes an Integrator block that uses continuous-time. The model analysis engine 216 may mark the Fuel Calculation component 510 as not compatible. In addition, the model analysis engine 216 may mark the Controller component 406 (FIG. 4) as not compatible, because Controller component 406 contains Fuel Calculation component 510. However, components contained within a not compatible component may not be automatically deemed not compatible. Instead, the components contained within a not compatible component may be individually evaluated to determine whether they are not compatible.

In another embodiment, the model analysis engine 216 may abstract or approximate a component that is found to be not compatible in the higher-level parent component that contains the otherwise not compatible component. The model analysis engine 216 may then determine whether the higher-level parent component, containing the abstraction or approximation of the lower-level component, is compatible. The model analysis engine 216 also may run the verification on each child component contained within an incompatible component to isolate the smallest subcomponent that requires abstraction or approximation so that a higher-level parent component may be made compatible. Exemplary abstraction or approximation procedures that may be used include stubbing a component so that its output values are analyzed as though they can take any arbitrary value independent of their inputs. Another example approximation technique is to replace a complicated mathematical expression with a lookup table.

The iteration engine 220 may next determine which of the compatible components of the model 400 are analyzable, and which components not analyzable by the specified model verification analysis technique, as indicated at block 320. The iteration engine 220 may use one or more thresholds, such as a completion threshold, in determining whether a given component is analyzable. A first completion threshold may relate to a maximum time, e.g., processing time, that may be spent by the iteration engine 220 evaluating a model component. A second completion threshold may relate to a number of undecided test objectives. A third completion threshold may relate to a number of test objectives that produce an error due to non-linear operations. A fourth completion threshold may relate to the precision of results given blocks that are abstracted or approximated from iterations on child components or incompatible subsystems. Other completion thresholds may also be used. In an embodiment, the iteration engine 220 may start its evaluation of the model 400 from a component located at the lowest level of the model hierarchy. In another embodiment, analysis of the model 400 may start from an initial model component based on a measure of component size.

If the selected verification analysis technique is the generation of test cases based on a model coverage objective, such as condition, decision, or modified condition/decision (MCDC), the iteration engine 220 may determine the total number of test objectives for the component, and the number of undecided test objectives. The iteration engine 220 determines that a test objective is undecided when the analysis engine is unable to determine an outcome for the test objective before maximum processing time. That is, before maximum processing time, the model analysis engine 216 is unable to create a test case that can satisfy the particular test objective and is unable to conclude that a test objective cannot be satisfied for any test case.

In an embodiment, an undecided test objective may be an objective that could neither be satisfied nor falsified by the analysis engine 216. That is, a test objective for which the analysis engine 216 was unable to either prove that the objective was satisfied (by generating a test case for the objective), or disprove (by exhaustively testing or mathematically reasoning that the objective cannot be satisfied).

As described, for model coverage purposes, a test objective may be created automatically for one or more, and preferably all, of the simulation pathways through a model. In other embodiments, a test objective may be an intended value that one or more signals within a model are to have at least once during execution of the model. For example, for a logic signal, the intended value may be True. The verification system 214 may include a library containing a plurality of verification block types. A user may select one or more of the verification block types from the library, and add an instance of the selected verification block type to a model. The user may then configure the verification block to specify the intended value, thereby defining a respective test objective.

The iteration engine 220 may stop its analysis of a model component after the time specified by the MaximumProcessingTime parameter is reached. If the analysis is halted before all test objectives for that component have been evaluated, the iteration engine 220 may consider any such unresolved test objectives as undecided test objectives.

The iteration engine 220 may determine whether the ratio of undecided test objections to total test objectives for the subject model component is greater than the MaximumObjectiveUndecidedRatio parameter. If the determined ratio is greater than this parameter, the iteration engine 220 may mark the subject model component as not analyzable. For each component of the model 400 that is marked as being not analyzable, the iteration engine 220 may also mark all higher-level components within the model hierarchy that contain the not analyzable component, without individually evaluating those higher level components. However, the iteration engine 220 may evaluate individually the components contained within a component found to be not analyzable.

The iteration engine 220 also may determine the number of test objectives for the subject block that are not suitable for analysis because they exceed some fundamental analysis limitation. For example, if a block performs non-linear arithmetic, certain analysis techniques may fail to resolve the objective because they are constrained to solve linear problems when the model analysis engine 216 tries to satisfy the test objectives created for that block. Similarly, if a block whose output is connected to a different block with test objectives computes its output with non-linear operations, then a limitation may prevent results when the model analysis engine 216 tries to satisfy those test objectives.

The iteration engine 220 may then determine whether the ratio of the number of test objectives that produce errors to the total number of test objectives for the subject block is greater than the MaximumObjectiveErrorRatio parameter. If the determined ratio is greater than this parameter, the iteration engine 220 may mark the model component containing the subject block as not analyzable. For each component of the model 400 that is marked as being not analyzable, the iteration engine 220 may also mark all higher-level components within the model hierarchy that contain the not analyzable component as also being not analyzable without evaluating these higher-level components. However, the iteration engine 220 may evaluate individually the components contained within a component found to be not analyzable.

The iteration engine 220 may determine whether the analysis of the given component is trivial, as indicated at block 322. If the total number of test objectives in the component is less than the 'MinimumNumberObjectives' parameter, then analysis of the component may be deemed trivial. The iteration engine 220 may mark such components as trivial, as indicated at block 324.

In an embodiment, the iteration engine 220 may proceed through the model as follows. If an the initial model component is found to be analyzable under the type of model analysis, the iteration engine 220 may evaluate a next model component that is located at a next higher level of the model hierarchy and that contains the initial model component. If the iteration engine 220 determines that an initial model component is not analyzable, the iteration engine 220 may evaluate a next model component that is located at a next lower level of the model hierarchy, and that is contained within the initial model component.

After determining whether each component of the model 400 is one of not compatible, not analyzable, analyzable, and, if analyzable, trivial, the iteration engine 220 may identify the largest group of hierarchically contained components of the model 400 that are analyzable, as indicated at block 326. The iteration engine 220 may store the information generated during the evaluation of the model in the 'results' variable, as indicated at block 328. If requested, the report generator 224 may produce a report containing some or all of the data stored in the 'results' variable, as indicated at block 330.

FIG. 9 is a schematic illustration of an embodiment of a report 900 that may be produced by the report generator 224. The report 900 may be organized as a table having a plurality of rows and columns whose intersections define cells or records for holding information, such as data. In particular, the report 900 may include a Component name column 902, a Compatible column 904, an Analysis Time column 906, a Total Objectives column 908, a Satisfied Objectives column 910, a Satisfied Objectives without Test Case column 912, a Falsified Objectives (proven unsatisfiable) column 914, an Objectives Producing Errors column 916, and an Undecided Objectives column 918. The report 900 may also include a plurality of rows 920, where each row corresponds to a respective component of the model. As shown, the Fuel Calculation component 510 of the model 400, which is represented at row 920c of the report, was found to be not compatible. Furthermore, for the Control Logic component 504, which is represented at row 920a, only 59 of the 109 test objectives were satisfied. The Control Logic component 504 may thus be deemed not analyzable.

In other embodiment, the report 900 may include additional or other information. For example, the report 900 may include additional columns for indicating whether any blocks of the component were replaced, and whether values were detected and used for any tunable parameters for the blocks of the component. If the model is analyzed by the model analysis engine 216, the results of that analysis, such as condition coverage analysis, decision coverage analysis, etc., may be included in the report 900.

In a further embodiment, the iteration engine 220 may determine whether the components of the model being evaluated can be extracted from the model for individual testing or analysis of the component. Component input and output signals should satisfy a user configurable set of constraints to identify whether or not a component can be extracted. For example, a user may only allow extraction of components that do not have algebraic relationships between their input signals. Furthermore, the report 900 may include a new column having information indicated whether the respective component may be successfully extracted from the model for individualized testing or analysis. Such a component may be extracted from the model and separately analyzed or evaluated by the model analysis engine 216.

The report generator may also create a hierarchical map of the model 400 indicated which model components are analyzable, not analyzable, not compatible, and trivial, as indicated at block 332.

Figure 10:
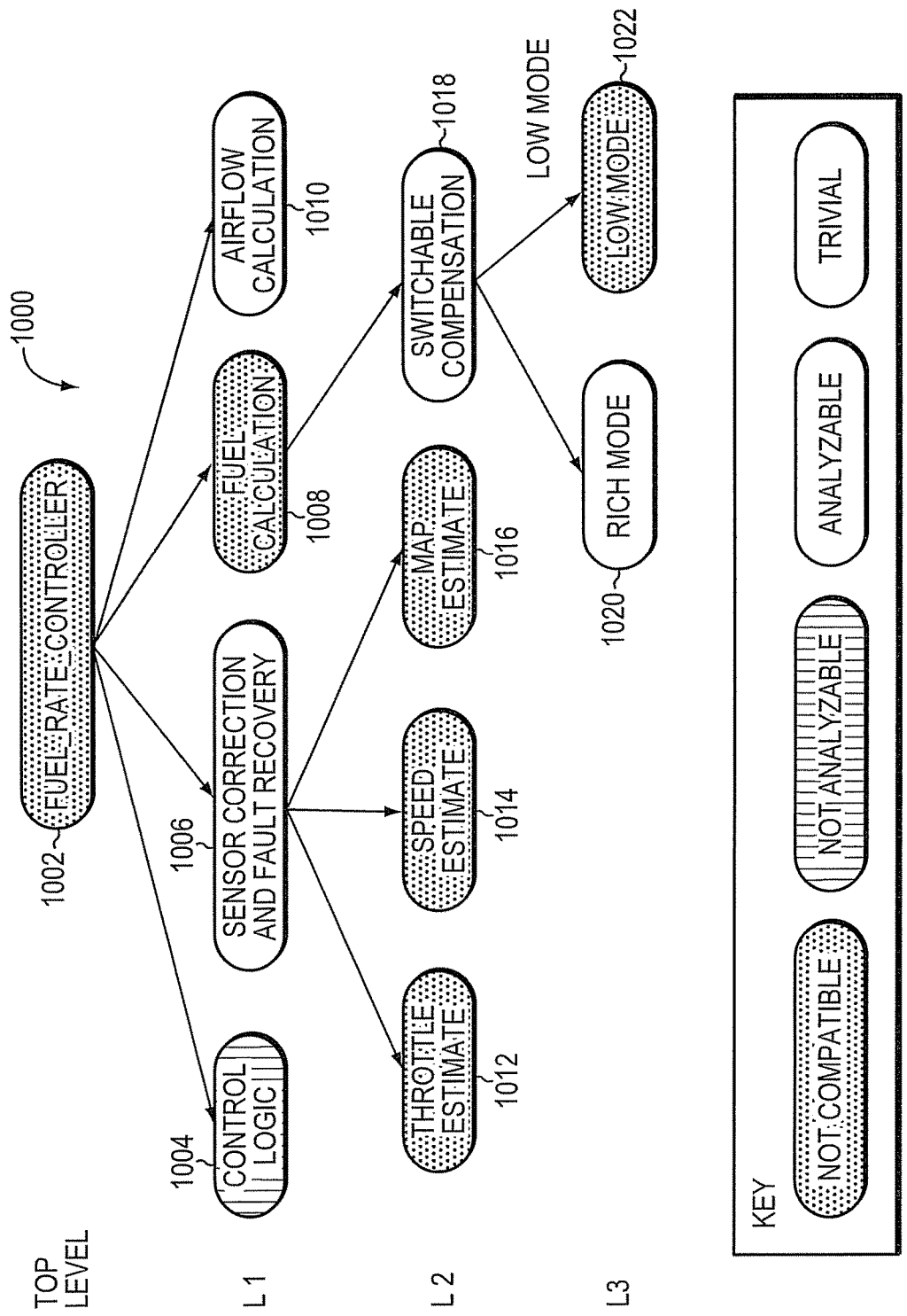
FIG. 10 is a schematic illustration of a model hierarchy map that can be generated in accordance with an embodiment of the invention.

FIG. 10 is a schematic illustration of a hierarchical map 1000 produced for model 400. The map 1000 may include an entry for each component of the model 400, and the entries may be organized on the map according to the hierarchical level at which the respective component is located. Specifically, the map 1000 may include an entry 1002 for the Fuel_Rate_Controller component located at the top level of the hierarchy. At a next lower level of the model hierarchy, e.g., Level 1, the map 1000 may include entries 1004 to 1010 for the Control logic component, the Sensor Correction and Fault Redundancy component, the Fuel Calculation Component, and the Airflow Calculation component, respectively. At a next lower level, e.g., Level 2, the map 1000 may includes entries 1012 to 1018 for the Throttle Estimate component, Speed Estimate component, MAP estimate component, and Switchable Compensation component, respectively. At a next lower level, e.g., Level 3, the map 1000 may include entries 1020 to 1022 for the RICH mode component and the LOW mode component, respectively.

In an embodiment, the visualization engine 222 may annotate the map 1000 to indicate those components that are not compatible, not analyzable, analyzable, and whose analysis is trivial. For example, shading, color-coding, fill designs, or other techniques may be used. For a color-coding technique, entries for not compatible components may be shown in red, entries for not analyzable components may be shown in orange, entries for analyzable components may be shown in green, and entries for components whose analysis is trivial may be shown in light green.

The model analysis engine 216 may perform the selected verification analysis technique on largest group of components, as identified by the iteration engine 220, as indicated at block 334.

The model analysis engine 261 may also perform the selected verification analysis technique on the other components that are not part of the largest group, but were identified as being analyzable, as indicated at block 336.

Model Partitioning

In designing, analyzing, and/or testing a computer-generated model of a system, such as an executable graphical or block diagram model, a user may desire to partition the block diagram with respect to one or more model elements, such as a block or a component. Such partitioning may be used to increase scalability of various analysis techniques and/or applications, such as, for example, the Simulink Design Verifier analysis engine from The MathWorks, Inc. of Natick, Mass. The partitioning may also be used for other purposes, such as to isolate a particular portion of the model in order to analyze and/or modify it, to test it within the context of another model, etc. The overall usefulness and results of the partitioning may depend on the methodology used to partition the block diagram model. For example, an algorithmic component that is to be analyzed may located in or be part of a feedback loop that includes other model elements. Extracting only the component into a new model and analyzing that model may not produce correct results because the analyzed model may not include characteristics of the feedback loop. Similarly, inputs of the component may be algebraically dependent on each other in the original model, and analyzing the component by assuming the inputs independence may also not provide a proper representation of the component's behavior. Embodiments of the invention address partitioning block diagram models with respect to a given model element, such as a component, into one or more executable contextual models that better capture the characteristics of the given model element.

An embodiment includes an automated solution to partitioning an original block diagram with respect to a given component in it. Partitioning an original model with respect to the given component may include isolating the component in such a way as to derive a contextual model. The derived contextual model may include the given component and an execution context for the given component. In an embodiment, the derived contextual model, when executed, provides an execution behavior for the given component that is not dissimilar from the execution behavior of that same component in the original model. The level of similarity may be configured as desired by the user and/or the provider of the embodiment.

The derived contextual model may include a set of dependencies, a data dependency graph, and/or execution dependencies captured from the original block diagram relating to the given component. These dependencies and/or the flow graph may be used to analyze the given component, and may also be used to provide its execution behavior in the derived contextual model.

Figure 11A:
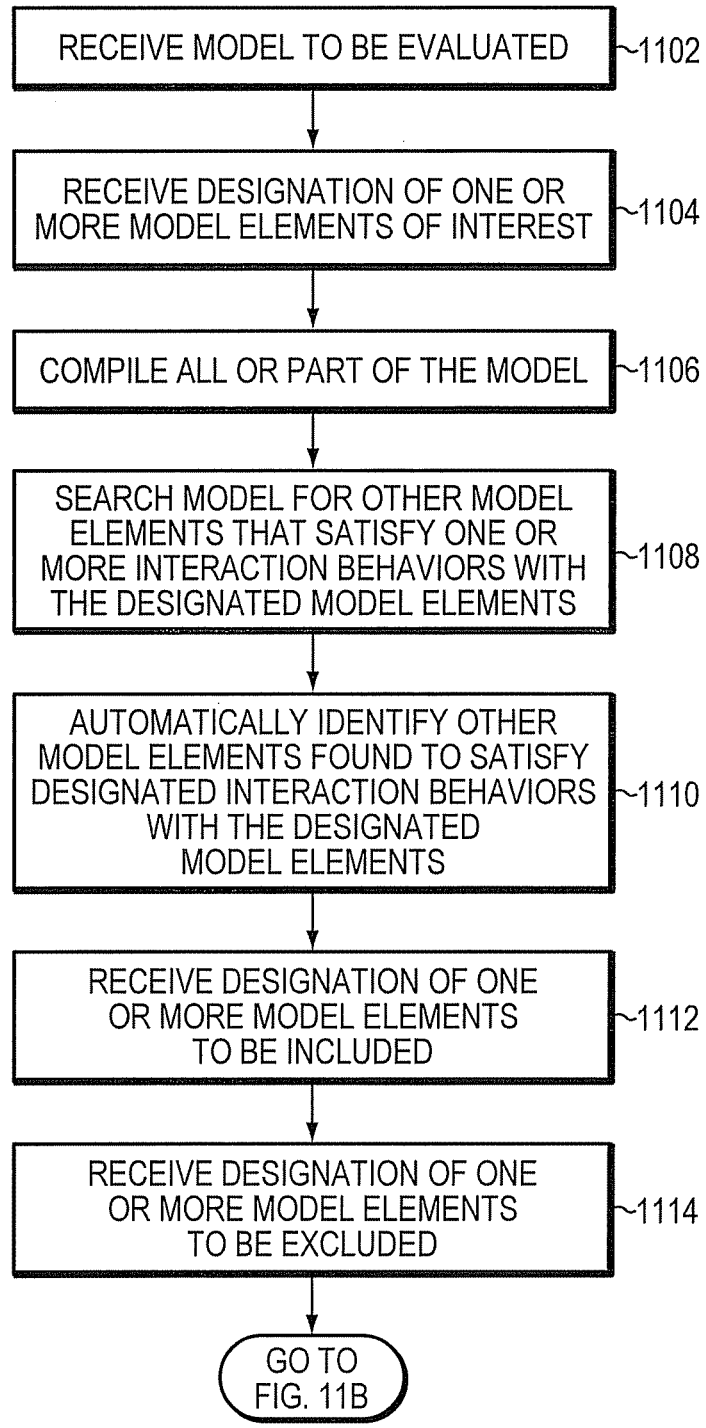
FIGS. 11A-B are partial views of a flow diagram of exemplary processing that can be used in accordance with an embodiment of the invention.
Figure 11B:
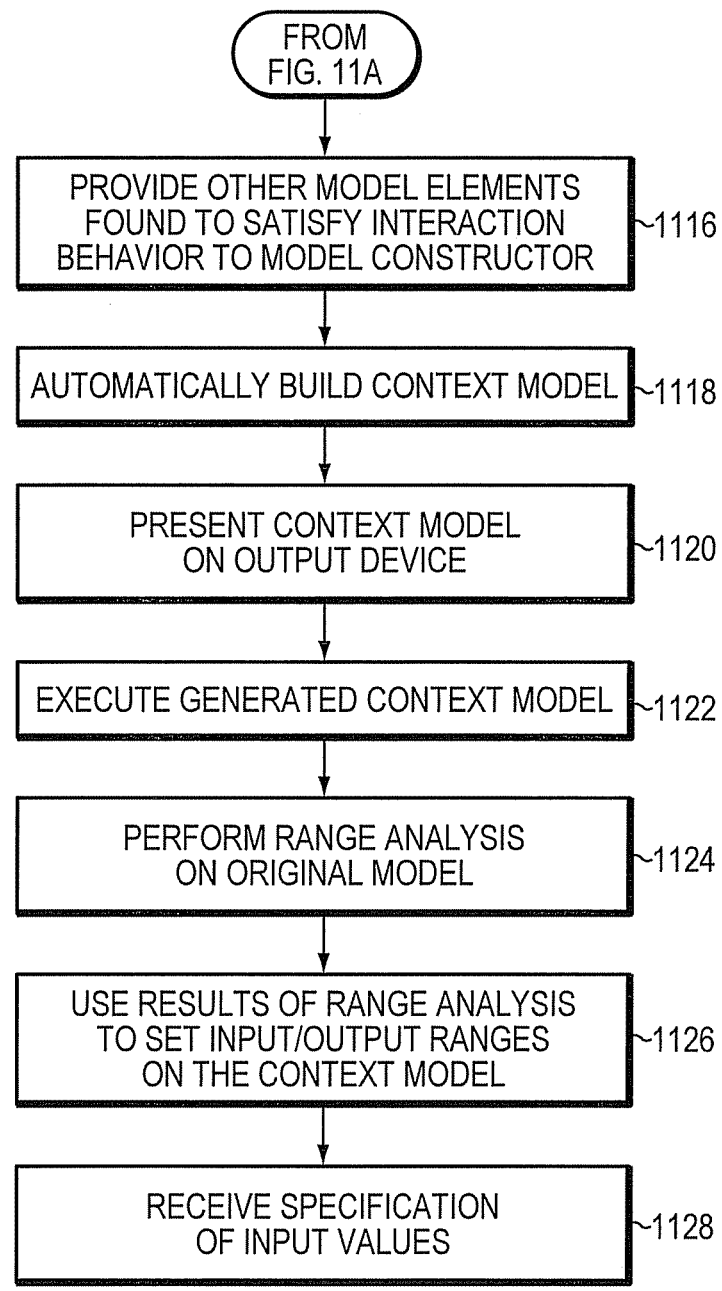

FIGS. 11A-B are partial views of a flow diagram of exemplary processing in accordance with an embodiment of the invention. The verification system 214 may receive a model or a portion thereof to be evaluated, as indicated at block 1102. The contextual information extraction engine 218 may receive a designation of one or more model elements of interest, as indicated at block 1104. For example, a user may be interested in the operation of a particular component, block, statechart or other element of the model. The user may designate this model element through one or more graphical inputs, e.g., using the mouse 118, or by identifying the model element by name through a textual command. The contextual information extraction engine may evaluate the model, including the portion of the model containing the identified model element, to identify other model elements, such as other components, blocks, statecharts, signals, transitions, etc, that would be needed in order to perform a desired analysis of the identified model element. The derived contextual model may contain a minimal set of model elements in such a way that, when executed, time dependent algebraic relationships on the input and output signals of the component, and computed ranges on the input and output interface of the component can be reproduced in the same way that they can be observed in the original model or block diagram. Evaluation of the received model and the one or more identified model elements of interest may begin by compiling the model, which may convert the model into an executable form. Specifically, the compiler 202 may compile all or part of the model 400, as indicated at block 1106. In addition, the IR builder 212 may build one or more in-memory representations of the model, such as one or more intermediate representations (IRs). The IRs may by in the form of a data, control, call, or data/control/call graph, and include a plurality of nodes, that may represent the blocks and other elements of the model, and edges that represent connections within the model. In an embodiment, the verification system 214 may evaluate the model by examining one or more of the IRs.

The contextual information extraction engine 218 may search the model for one or more other model elements, such as signals, transitions, states, blocks, and components that satisfy one or more interaction behaviors with the identified model element of interest, as indicated at block 1108. The contextual information extraction engine 218 may search across hierarchical levels of the model. That is, if the identified model element of interest is located at a first hierarchical level, the contextual information extraction engine 218 may search levels of the model hierarchy above and below the level containing the identified model element of interest. The contextual information extraction engine 218 may identify automatically each model element that is found to satisfy the one or more interaction behaviors, as indicated at block 1110. In one embodiment, the contextual information extraction engine 218 may be pre-configured with the one or more interaction behaviors. In another embodiment, an interaction behavior may be defined, e.g., by a user, and provided to the contextual information extraction engine 218.

A first interaction behavior may be a feedback loop behavior. To determine whether other elements of the model satisfy the feedback loop interaction behavior, the contextual information extraction engine 218 may examine one or more IRs generated for the model starting at the identified model element of interest. The contextual information extraction engine 218 may follow the output signals leading from the output port or ports of the identified model element of interest to identify the destination components or blocks of those output signals. For example, the contextual information extraction engine 218 may traverse the edges of the IR that correspond to these output signals, and identify the nodes to which these edges are connected. The contextual information extraction engine 218 may continue to follow the paths of the output signals from the identified model element of interest to determine whether any of these paths lead to an input port of the identified component or block of interest. Such a path that leads from an output port of the model element of interest to one of its input ports may represent a feedback loop within the model. The contextual information extraction engine 218 may mark the signals, blocks, components and other elements along this feedback loop as satisfying the feedback loop interaction behavior.

A second interaction behavior may be an input dependency. For example, an algebraic and/or mathematical relationship may exist among the signals connected to two or more input ports of the identified model element. To determine whether any elements of the model satisfy the input dependency interaction behavior, the contextual information extraction engine 218 may follow the input signals to the identified model element in a reverse direction to identify two or more input signals that have an algebraic or mathematical relationship. Specifically, the contextual information extraction engine 218 may traverse the edges of the IR corresponding to these input signals, and identify the nodes to which these edges are connected. The contextual information extraction engine 218 may continue to follow the paths past the first nodes. The paths that correspond to two or more input signals to the identified model element may merge, for example, at a junction point, at some upstream location relative to the identified model element. The contextual information extraction engine 218 may determine that such input signals of the identified model element have an algebraic or mathematical relationship. The contextual information extraction engine 218 may mark one or more, and preferably all, of the model elements, e.g., all blocks, components, states, transitions, signals, etc. between the input ports of the identified model element and the merge point, and designate these marked model elements as satisfying the input dependency interaction behavior.

A third interaction behavior may be an output execution affect. For example, one or more output signals computed by the identified model element of interest may affect the execution of one or more other elements of the model, such as another block, component, statechart, etc. To determine whether the execution of the identified model element of interest affects the execution of any elements of the source model, the contextual information extraction engine 218 may follow the one or more output signals of the identified model element to identify the model elements that utilize the one or more output signals as their inputs. Such an element may be marked as satisfying the affected execution interaction behavior. In an embodiment, the contextual information extraction engine 218 may identify just the first destination element whose execution is affected by one or more output signals of the identified model element of interest. In another embodiment, the contextual information extraction engine 218 may continue its evaluation of the source model to identify a second, third or even subsequent model element whose execution is affected by one or more output signals of the identified model element. The level of evaluation may be specified, e.g., selected by a user, and provided to the contextual information extraction engine 218. Alternatively, the contextual information extraction engine 218 may identify only those model elements whose execution is affected by a plurality of output signals of the identified model element, such as two, three, or more output signals. The particular number of output signals may be specified, and provided to the contextual information extraction engine 218.

A fourth interaction behavior may be an input execution affect. For example, the values for one or more input signals to the identified model element of interest may be affected, for example, computed, by the execution of one or more other elements of the source model. To determine whether an input signal to the identified model element of interest is affected by the execution of another element of the source model, the contextual information extraction engine 218 may following the one or more input signals of the identified model element in a reverse direction to identify the model elements that compute, modify or update the one or more input signals. Such an element may be marked as satisfying the affected by execution interaction behavior. In an embodiment, the contextual information extraction engine 218 may identify just the first source element whose execution affects one or more input signals of the identified model element of interest. In another embodiment, the contextual information extraction engine 218 may continue its evaluation of the source model to identify a second, third or even additional model element whose execution affects the one or more input signals of the identified model element. The level of evaluation may be specified, e.g., selected by a user, and provided to the contextual information extraction engine 218. Alternatively, the contextual information extraction engine 218 may identify only those model elements whose execution affects a plurality of input signals to the identified model element, such as two, three, or more output signals. The particular number of input signals may be specified, and provided to the contextual information extraction engine 218.

The one or more interaction behaviors to be utilized by the contextual information extraction engine 218 may be selected by the user. Alternatively, the one or more interaction behaviors may be determined programmatically by the model analysis engine that may leverage the contextual model for the analysis of one or more components of interest. For example, analysis by the Simulink Design Verifier product on a component may require a contextual model where the interactions for feedback loop behavior, input dependency, and input execution affect are captures.

The contextual information extraction engine may perform static range analysis on the model according to user-defined minimum/maximum values for signal and parameter data types and identify ranges on the input/output interface of the component of interest. The contextual information extraction engine may also perform dynamic range analysis on the input/output interface of the component of interest, by simulating the model according to a test suite. Ranges computed from dynamic and static range analysis may be combined and the user specified ranges on the input/output interface of the component in the derived contextual model may be set according to those combined ranges.

In an embodiment, a user may exert at least some control over the creation of a contextual model for the identified model element of interest. For example, the contextual information extraction engine 218 may receive a designation of one or more elements of the model that are to be included in the contextual model being created, as indicated at block 1112. For example, a user may designate one or more elements of the model, e.g., graphically with the mouse 118 or textually through the entry of a textual command, that the user specifically wants included in any contextual model to be constructed. The contextual information extraction engine 218 also may receive a designation of one or more model elements that are to be excluded from a contextual model, even though these elements might otherwise satisfy an interaction behavior being applied to the model, as indicated at block 1114. For example, a user may designate one or more elements of the model, e.g., with the mouse 118 or through a textual command, that the user specifically wants excluded from any contextual model to be constructed. That is, the user may annotate the model with information identifying model elements to be included and/or excluded from the identification of other model elements.

The model elements identified as satisfying the one or more interaction behaviors may be provided by the contextual information extraction engine 218 to the model constructor 208, as indicated at block 1116. The model constructor 208 may build a model, specifically a contextual model, as indicated at block 1118. In an embodiment, the contextual model includes only the identified model element of interest, and the other model elements that were identified by the contextual information extraction engine 218 as satisfying the one or more interaction behaviors. These other model elements may be referred to as an execution context for the identified model element of interest. The contextual model built by the model constructor 208 is itself a computer-generated, executable model, such as a block diagram. The model constructor 208 may present the contextual model to the user, e.g., on the display 120, as indicated at block 1120. A user may run or execute the contextual model, as indicated at block 1122. In an embodiment, range analysis may be performed on the original model, as indicated at block 1124. The results of the range analysis operation may be used to set ranges on input and/or output ports of the contextual model, as indicated at block 1126.

In addition, or alternatively, the user may specify one or more input values, and evaluate the operation of the contextual model on the specified one or more input values, as indicated at block 1128. The user may examine the results produced by the contextual model. For example, the user may add one or more sink blocks, such as a Scope block, to the contextual model in order to visualize one or more results produced by the contextual model during execution. The evaluation of the contextual model may include formal analysis.

In an embodiment, the one or more interaction behaviors utilized by the contextual information extraction engine 218 result in the creation of a contextual model in which the identified model element of interest produces output values that are numerically consistent with the output values produced by the identified component or block or interest as part of the original model. Numerical consistency may refer to the fact that outputs computed by the component of interest in the contextual model and the original model attain the same values during execution.

In an embodiment, the model constructor 208 may build the contextual model by partitioning the original model.

Figure 12:
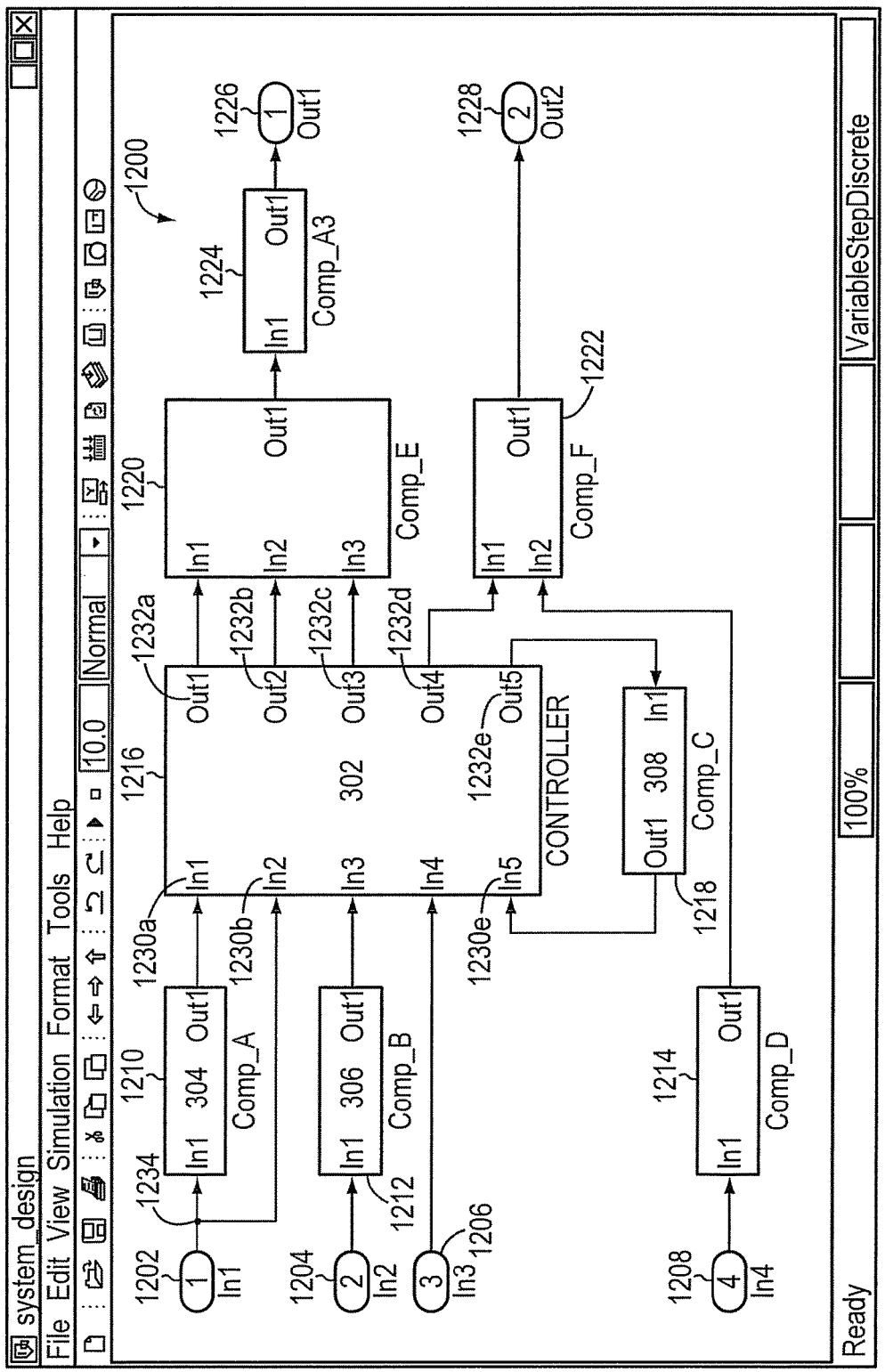
FIG. 12 is a schematic illustration of a graphical model having executable semantics.

FIG. 12 is a schematic illustration of a source model 1200. The source model includes a plurality of interconnected model elements. Specifically, the source model includes four Inports 1202-1208, eight components 1210-1224, and two Outports 1226, 1228. Suppose the controller component 1216 is identified as the model element of interest. The controller component 1216 has five input ports 1230a-e, and five output ports 1232a-e. Applying the feedback loop interaction behavior, the contextual information extraction engine 218 determines that a path from output port 1232e leads to input port 1230e through component 1218. Accordingly, the contextual information extraction engine 218 marks component 1218 and the signals connecting output port 1232e and input port 1230e as satisfying the feedback loop interaction behavior. Furthermore, the contextual information extraction engine 218, applying the input dependency interaction behavior, determines that the signals leading to input ports 1230a and 1230b merge at a merge point 1234 in the model 1200. Accordingly, the contextual information extraction engine 218 marks components 1210 and 1212 and the signals from the merge point to the input ports 1230a and 1230b as satisfying the input dependency interaction behavior.

Figure 13:
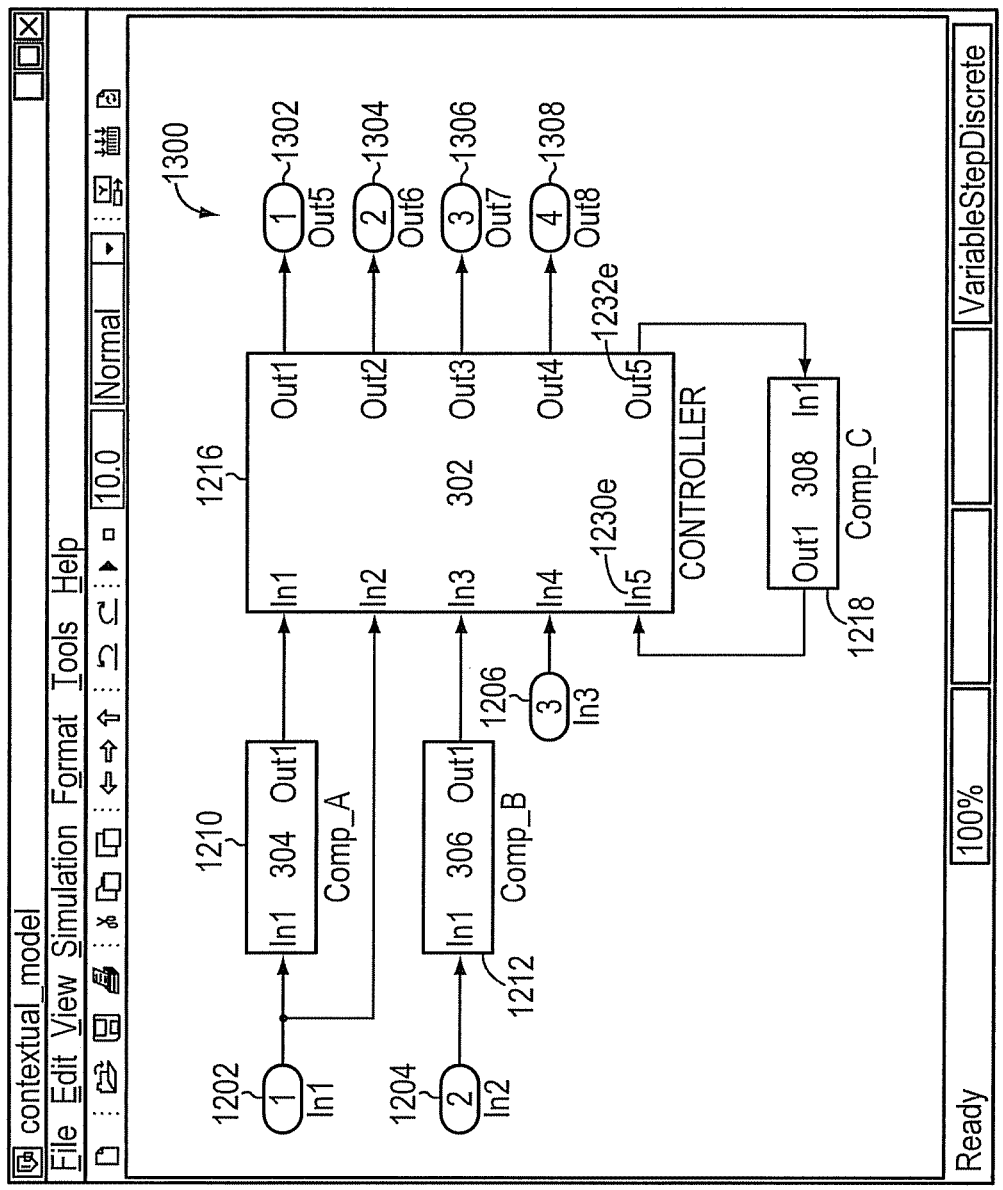
FIG. 13 is a schematic illustration of a graphical contextual model having executable semantics that can be generated in accordance with an embodiment of the invention.

FIG. 13 is a schematic illustration of a contextual model 1300 generated from source model 1200. The contextual model 1300 includes the identified model element of interest, namely the controller component 1216. The contextual model 1300 also includes the elements of the source model 1200 that satisfied the feedback loop interaction behavior, namely component 1218 and the signals leading from output port 1232e to input port 1230e. The contextual model 1300 further includes the elements of the source model 1200 that satisfied the input dependency interaction behavior. Specifically, the contextual model 1300 includes components 1210 and 1212, and the signals from join point 1234 to the input ports 1230a and 1230b of the controller component 1216.

As shown, numerous elements of the source model 1200 are omitted from the contextual model 1300. For example, components 1214, 1220, 1222 and 1224 are not included in the contextual model, because none of these elements satisfied the one or more interaction behaviors applied by the contextual information extraction engine 218. The contextual model 1300 also includes Outports 1302-1308 that are connected to output ports 1232a-d of the controller component 1216.

If the interaction behavior applied by the contextual information extraction engine 218 is the output execution affect interaction behavior, then components 1218, 1220, and 1222, and possibly component 1224, may be included in the contextual model. If the interaction behavior applied by the contextual information extraction engine 218 is the input execution affect interaction behavior, then components 1210, 1212, and 1218 may be included in the contextual model.

Model Constraints and Scopes of Analysis

Figure 14A:
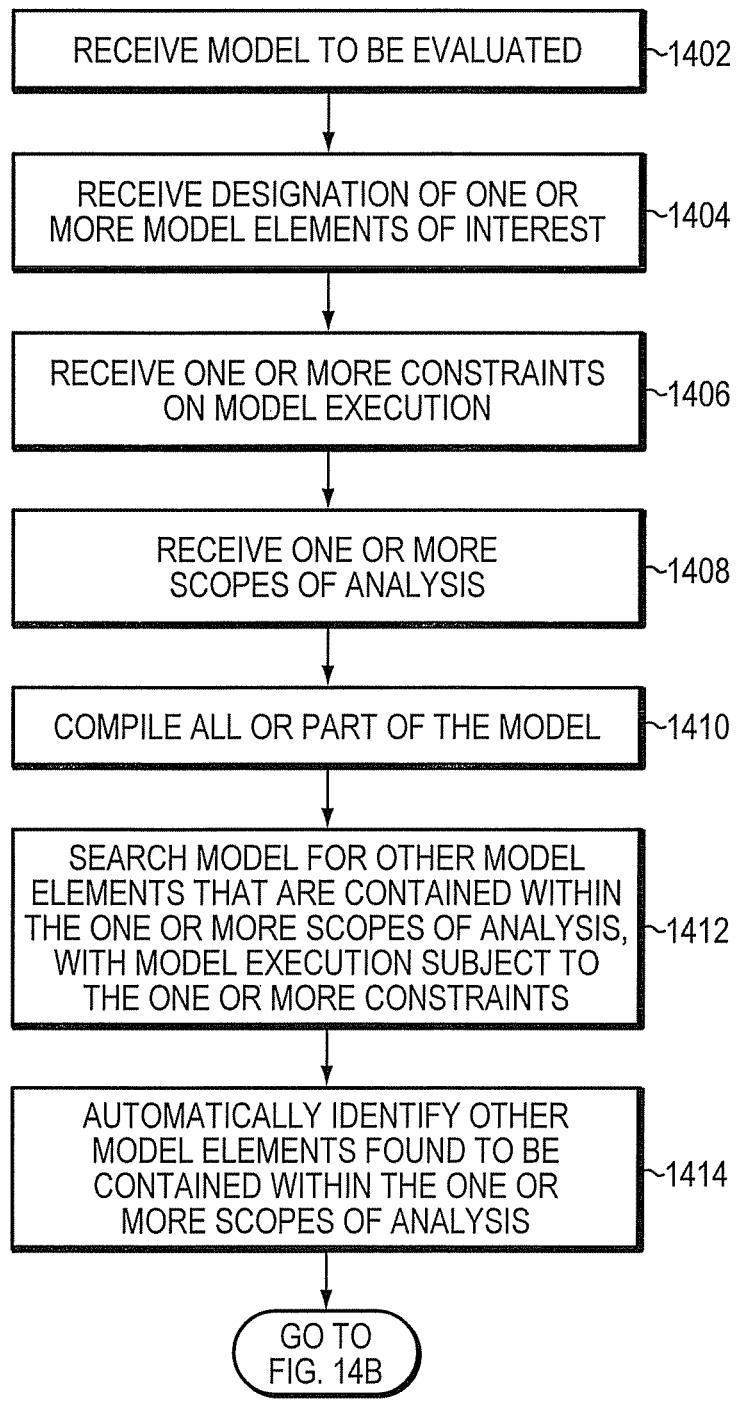
FIGS. 14A-B are partial views of a flow diagram of exemplary processing that can be used in accordance with an embodiment of the invention.
Figure 14B:
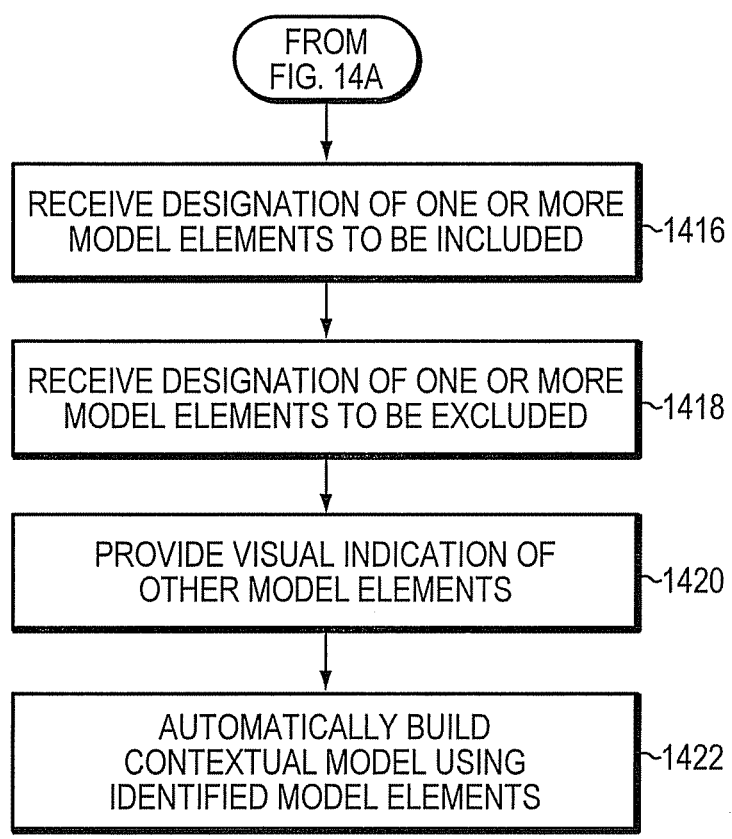

FIGS. 14A-B are a flow diagram of exemplary processing in accordance with an embodiment of the invention. The verification system 214 may receive a model or a portion thereof to be evaluated, as indicated at block 1402. The contextual information extraction engine 218 may receive a designation of one or more model elements of interest, as indicated at block 1404. The contextual information extraction engine 218 may also receive one or more constraints on the execution of the model, as indicated at block 1406, and one or more scopes of analysis, as indicated at block 1408.

The contextual information extraction engine 218 may evaluate the model executing under the one or more constraints, to identify other model elements, such as other components, blocks, statecharts, signals, etc. that are contained within the received one or more scopes of analysis. Evaluation of the received model and the one or more identified model elements of interest may begin by compiling the model, which may convert the model into an executable form. Specifically, the compiler 202 may compile all or part of the model 400, as indicated at block 1410. In addition, the IR builder 212 may build one or more in-memory representations of the model, such as one or more intermediate representations (IRs). The IRs may include a plurality of nodes, that may represent the blocks of the model, and edges that represent connections within the model. In an embodiment, the verification system 214 may evaluate the model by examining one or more of the IRs.

With the one or more constraints applied to the model, the contextual information extraction engine 218 may search the model for one or more other elements that are contained within the one or more scopes of analysis, as indicated at block 1412. The contextual information extraction engine 218 may search across hierarchical levels of the model. That is, if the identified model element of interest is located at a first hierarchical level, the contextual information extraction engine 218 may search levels of the model hierarchy above and below the level containing the identified model element of interest. The contextual information extraction engine 218 may identify automatically one or more, and preferably all, other model elements that are contained within the one or more scopes of analysis, as indicated at block 1414.

The contextual information extraction engine 218 may receive a designation of one or more elements of the model that are to be included in its identification of other model elements, pursuant to the one or more scopes of analysis, as indicated at block 1416. The contextual information extraction engine 218 also may receive a designation of one or more model elements that are to be excluded from the identification of other model elements, as indicated at block 1418. For example, the user may annotate the model with information identifying model elements to be included and/or excluded from the identification of other model elements.

In an embodiment, visualization engine 222 may modify the source model to provide a visual indication of one or more, and preferably all, model elements identified by the contextual information extraction engine 218 as contained within the one or more scopes of analysis, while the model is subject to the one or more constraints, as indicated at block 1420. For example, the visualization engine 222 may redraw the model elements identified as contained within the one or more scopes of analysis, as they are shown on the display 120, using a different color. Alternatively or additionally, the visualization engine 222 may use one or more animated graphical user interface (GUI) features, such as blinking lines, to indicate which model elements were identified as contained within the one or more scopes of analysis, while the model was subject to the one or more constraints.

In another embodiment, the model constructor 208 may build a contextual model that includes only the model elements that were identified as contained within the one or more scopes of analysis, and the identified model element of interest, as indicated at block 1422.

In an embodiment, a constraint limits or constrains at least one input of a model element, such as an input signal or a state, and more often, limits a range of inputs defined in the model. A constraint may thus restrict the model's execution space. It should be understood that many different types or forms of constraints may be defined and applied to the model. For example, one or more constraints may be defined in order to specify (1) what parts of the model are inactive (e.g., remain constant), (2) what parts of the model are active (e.g., contribute to the model's dynamics), or (3) what parts of the model meet or fail a particular type of verification analysis, such as dead or unreachable code analysis. One or more other constraints may be used in order to specify the parts of a model that are active (e.g., contribute to the model's dynamics) at a specific point in time during the model's execution or during a time period or a time range. For example, a model may have a simulation start time of zero, and a simulation end time of ten seconds, and a constraint may be defined for a time range from 2.0 to 5.0 seconds.

A scope of analysis may be used to define a domain of interest that may be downstream of one or more model elements of interest. A scope of analysis may be defined by a set of output signals or states computed by the one or more identified model elements of interest. For example, the source model may include a state-based component having ten output ports. A scope of analysis may be the first five output ports of the state-based component. In another embodiment, the scope of analysis may include one or more additional signals, other than signals for outputs of the one or more first model components.

Constraints also may be defined in a plurality of different ways. A constraint may specify a particular input or output value of a block, component, statechart or other model element having inputs and outputs. For example, if a logic block has an input or an output whose value may be either True or False, a constraint may set this input or output to either True or False during execution of the model. In another embodiment, a numeric value associated with an input or output of a block or component may be specified to be a particular value. In another embodiment, a numeric value associated with an input or output port of a block or component may be specified to be within a given range of values.

For a state-based element, such as a state-based component, a first constraint may require the state-based component to remain in a first state, such as a normal state, a wait state, or an error state, among others, during execution of the model. A second constraint may preclude the state-based component from entering a particular state during execution of the source model.

For a model element of interest that is a time-based component, a constraint may be derived from one or more input signals to the time-based components. Other constraints may be derived from the model's simulation start time or end time. For example, a constraint may require a state-based component to be in a specific state at a start and/or stop time of a model.

In another embodiment, the model element of interest may have one or more executable modes, and a constraint may restrict the model element to a selected one of the executable modes. For example, a model element may have different implementations where only one implementation is active during execution of the model. Each of these implementations may represent a different execution mode of the model element. In addition, a model element of interest may be restricted to a specified executable mode only during a specified time epoch. A time epoch may refer to a specific time period that begins on or after the start time of the model, and ends on or before the end time of the model.

Referring to the graphical model 400 (FIG. 4), suppose a user is interested in evaluating the dynamics of the fuel rate controller component 406. The user may understand that the estimated air flow signal computed by the Airflow Calculation component 508 (FIG. 5) should change when the state of the Control Logic component 504 changes. In this case, the user may specify a constraint to the execution of the model 400 in which the Control Logic component 504 is in either the Warm-up state 614 or the Normal state 612, and may further specify a constraint that identifies which elements of the Airflow Calculation component 508 are active and contribute to the calculation of the Estimated Air Flow signal by the Airflow Calculation component 508.

Specifically, the verification system 214 may cause the simulation engine 206 to execute the model 400 while first holding the Control Logic component 504 in the Warm-up state 614. The contextual information extraction engine 218 may monitor the execution of the model 400, and identify those model elements contained in the Airflow Calculation component 508 that are both active and that contribute to the calculation of the Estimated Air Flow signal by the Airflow Calculation component 508. Following execution of the model 400, the contextual information extraction engine 218 may provide the visualization engine 222 with the identity of the model elements from the Airflow Calculation component 508 found to be active and to contribute to the calculation of the Estimated Air Flow signal. The visualization engine 222 may then provide a visual indication of these elements, e.g., by changing their appearance, such as their color, on the display 120. The visualization engine 222 may also provide a different view of the model that depicts, for example, only these elements and the signals between them.

Again referring to the model 400, a user may understand that the value of the engine speed input signal 403, which is received by the Control Logic component 504, and is also used within the Airflow Calculation component 508 (FIG. 7) affects active model elements of the Airflow Calculation component 508. The user may specify a constraint in which the output of the Hold Integrator switch block 718 is fixed to be from its first data input, i.e., the output of the Product block 714. The user may further specify a scope of analysis to determine which elements of the Control Logic component 504 are active.

Here, the verification system 214 may cause the simulation engine 206 to execute the model 400 while fixing the Hold Integrator switch block 718 to output its first data input. The contextual information extraction engine 218 may monitor the execution of the model 400, and identify those model elements contained in the Control Logic component 504 that are active. Following execution of the model 400, the contextual information extraction engine 218 may provide the visualization engine 222 with the identity of the model elements from the Control Logic component 504 found to be active. The visualization engine 222 may then provide a visual indication of these elements, e.g., by changing their appearance, such as their color, on the display 120. The visualization engine 222 may also provide a different view of the model that depicts, for example, only these elements and the signals between them.

The foregoing description of embodiments is intended to provide illustration and description, but is not intended to be exhaustive or to limit the invention to the precise form disclosed. Modifications and variations are possible in light of the above teachings or may be acquired from a practice of the invention. For example, while a series of acts has been described above with respect to the flow diagrams, the order of the acts may be modified in other implementations. Further, non-dependent acts may be performed in parallel. Also, the term "user", as used herein, is intended to be broadly interpreted to include, for example, a computer or data processing system (e.g., system 100) or a user of a computer or data processing system, unless otherwise stated.

Further, certain embodiments of the invention may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system, such as system 100. The computer-executable instructions may include instructions that implement one or more embodiments of the invention. The tangible non-transitory computer-readable storage media may be volatile or non-volatile and may include, for example, flash memories, dynamic memories, removable disks, and non-removable disks.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present invention. It will be apparent, however, that other variations and modifications may be made to the described embodiments, with the attainment of some or all of their advantages. For example, one or more salient interactions may be specified for one or more model elements instead of, or in addition to, one or more component interaction behaviors. Therefore, it is the object of the appended claims to cover all such variations and modifications as come within the true spirit and scope of the invention.

What is claimed is:

1. A non-transitory computer-readable medium comprising program instructions, the program instructions when executed by a processing element operable to:

for a graphical model, the graphical model having executable semantics and including model elements and at least one model component, receive an identification of a given model element or the at least one model component of the graphical model, the given model element or the at least one model component including at least one input or at least one output and being identified for analysis;

evaluate automatically the graphical model to identify a set of the model elements of the graphical model, where the set of the model elements satisfy a component interaction behavior, where the component interaction behavior includes at least one of a dependency or an execution effect among at least one of the at least one input or the at least one output; and construct automatically a graphical contextual model, wherein
the graphical contextual model includes the given model element or the at least one model component and the set of the model elements identified as satisfying the component interaction behavior, and
the graphical contextual model is different from the graphical model by including fewer of the model elements than are included in the graphical model.

2. The computer-readable medium of claim 1 further comprising program instructions when executed by the processing element operable to:
run the graphical contextual model to produce one or more results, wherein the one or more results produced when the graphical contextual model is run are numerically consistent with one or more respective results produced when the graphical model is run.

3. The computer readable medium of claim 1 wherein the execution effect is by the given model element or the at least one model component on one or more other portions of the graphical model.

4. The computer readable medium of claim 1 wherein the execution effect is on the given model element or the at least one model component by one or more other portions of the graphical model.

5. The computer readable medium of claim 1 wherein the component interaction behavior includes a predefined interaction by one or more other portions of the graphical model with the given model element or the at least one model component.

6. The computer readable medium of claim 1 further comprising program instructions when executed by the processing element operable to:
store the graphical contextual model in a memory coupled to the processing element.

7. The computer readable medium of claim 1 further comprising program instructions when executed by the processing element operable to:
provide the graphical contextual model to an output device.

8. The computer readable medium of claim 1 wherein the dependency is an input dependency behavior.

9. The computer readable medium of claim 1 wherein the execution effect is at least one of
a feedback loop behavior,
an output execution effect, or
an input execution effect.

10. The computer readable medium of claim 1 wherein the graphical contextual model further includes one or more other model components of the graphical model.

11. The computer-readable medium of claim 1 wherein the given model element or the at least one model component has a plurality of inputs, the computer readable medium further comprising program instructions when executed by the processing element operable to:
perform dynamic range analysis on one or more of the plurality of inputs of the given model element or the at least one model component to identify a signal range; and
configure the graphical contextual model to operate within the identified signal range.

12. A method comprising:
for a source graphical model having executable semantics and including model elements and at least one model component,
receiving an identification of a given model element or the at least one model component of the source graphical model, the given model element or the at least one model component including at least one input or at least one output and being identified for a type of model analysis;
evaluating automatically, by a processor, the source graphical model to identify a set of the model elements of the source graphical model that satisfy at least one interaction behavior with the given model element or the at least one model component, where the at least one interaction behavior includes at least one of a dependency or an execution effect among at least one of the at least one input or the at least one output; and
constructing automatically a graphical contextual model, wherein
the graphical contextual model includes the given model element or the at least one model component and the set of the model elements identified as satisfying the at least one interaction behavior, and
the graphical contextual model is different from the source graphical model by including fewer of the model elements than are included in the source graphical model.

13. The method of claim 12 wherein the at least one interaction behavior is:
a feedback loop behavior,
an input dependency behavior,
an output execution effect, or
an input execution effect.

14. The method of claim 12 wherein the at least one model component has a plurality of inputs, the method further comprising:
performing dynamic range analysis on one or more of the plurality of inputs of the at least one model component to identify a signal range; and
configuring the graphical contextual model to operate within the identified signal range.

15. The method of claim 12 wherein
the at least one model component is a subsystem, a state chart, or a sub-model of the source graphical model, and
the set of model elements includes one or more blocks.

16. The method of claim 12 further comprising:
receiving a user selection of the at least one interaction behavior.

17. The method of claim 12 wherein
the source graphical model includes a plurality of hierarchical levels,
the at least one model component is at a first of the plurality of hierarchical levels, and
one of the model elements from the set of model elements is at a second of the plurality of hierarchical levels.

18. The method of claim 12 wherein
the at least one interaction behavior is selected based on the type of model analysis.

19. An apparatus comprising:
a memory configured to store a source graphical model having executable semantics and including a plurality of model elements; and
a processor coupled to the memory, the processor configured to:
receive an identification of a first model element of the source graphical model, the first model element identified for a type of model analysis and including at least one input or at least one output;

evaluate automatically the source graphical model to identify a set of the plurality of model elements of the source graphical model having at least one of data dependencies or control dependencies with the at least one input or the at least one output of the first model element; and construct automatically a graphical contextual model, wherein the graphical contextual model includes the first model element and the set of the plurality of model elements identified as having the at least one of the data dependencies or the control dependencies with the at least one input or the at least one output of the first model element, and the graphical contextual model is different from the source graphical model by including fewer of the plurality of model elements than are included in the source graphical model.

20. The apparatus of claim 19 wherein the processor is further configured to evaluate the source graphical model using one or more interaction behaviors to identify the set of the plurality of model elements.

21. The apparatus of claim 20 wherein the one or more interaction behaviors include at least one of:
a feedback loop behavior,
an input dependency behavior,
an output execution effect, or
an input execution effect.

22. The apparatus of claim 19 wherein the processor is further configured to:
receive a designation of a given model element for inclusion in the graphical contextual model, and
include the given model element in the graphical contextual model.

23. The apparatus of claim 19 wherein the processor is further configured to:
receive a designation of a given model element to be excluded from the graphical contextual model, and
exclude the given model element from the graphical contextual model.

\* \* \* \* \*

UNITED STATES PATENT AND TRADEMARK OFFICE
CERTIFICATE OF CORRECTION

PATENT NO. : 10,657,029 B2
APPLICATION NO. : 14/461906
DATED : May 19, 2020
INVENTOR(S) : William J. Aldrich et al.

It is certified that error appears in the above-identified patent and that said Letters Patent is hereby corrected as shown below:

In the Specification

Column 13, Line 18 reads:
"map 1000 may includes entries 1012 to 1018 for the Throttle"
Should read:
--map 1000 may include entries 1012 to 1018 for the Throttle--

In the Claims

Claim 14
Column 24, Line 32 reads:
"14. The method of claim 12 wherein the at least one model"
Should read:
--14. The method of claim 12 wherein the given model element or the at least one model--

Column 24, Line 36 reads:
"plurality of inputs of the at least one model component"
Should read:
--plurality of inputs of the given model element or the at least one model component--

Claim 17
Column 24, Line 53 reads:
"one of the model elements from the set of model elements"
Should read:
--one of the model elements from the set of the model elements--

Signed and Sealed this
Ninth Day of February, 2021

Drew Hirshfeld
*Performing the Functions and Duties of the
Under Secretary of Commerce for Intellectual Property and
Director of the United States Patent and Trademark Office*